United States Patent [19]
Kimura et al.

[11] Patent Number: 5,864,853
[45] Date of Patent: *Jan. 26, 1999

[54] PORTABLE FILE SYSTEM OPERABLE UNDER VARIOUS COMPUTER ENVIRONMENTS

[75] Inventors: Tetsuro Kimura, Kanagawa-ken; Toshio Okamoto, Tokyo, both of Japan

[73] Assignee: Kabushiki Kaisha Toshiba, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 528,056

[22] Filed: Sep. 14, 1995

[30] Foreign Application Priority Data

Sep. 14, 1994 [JP] Japan .................................. 6-219656

[51] Int. Cl.$^6$ ................................................... G06F 17/30
[52] U.S. Cl. ............................................. 707/10; 707/104
[58] Field of Search ...................... 345/173; 364/705.06, 364/900, 401, 200; 379/58; 395/601, 610, 616, 613; 707/10, 102, 104

[56] References Cited

U.S. PATENT DOCUMENTS

| | | | |
|---|---|---|---|
| 4,247,908 | 1/1981 | Lockhart, Jr. et al. ................. | 364/900 |
| 4,277,837 | 7/1981 | Stuckert ................................... | 364/900 |
| 5,058,000 | 10/1991 | Cox et al. ............................... | 364/200 |
| 5,339,239 | 8/1994 | Manabe et al. ......................... | 364/401 |
| 5,379,057 | 1/1995 | Clough et al. .......................... | 345/173 |
| 5,410,690 | 4/1995 | Kawata ................................... | 395/600 |
| 5,452,240 | 9/1995 | Roca et al. .......................... | 364/705.06 |
| 5,469,496 | 11/1995 | Emery et al. ............................. | 379/58 |

OTHER PUBLICATIONS

Verjinski, Phase "A Portable Host Access System Environment", IEEE, pp. 806–809, Oct. 1989.
Orchard, Predective Motion–Field Segmentation for Image Sequence Coding, IEEE, pp. 54–79, Jan. 1993.
Peters et al, On Generalization in Networking Software to Encourage Code Portability, IEEE, pp. 261–266, Apr. 1989.
Bernett et al, Uniform Communication Software Using TCP/IP, IEEE, pp. 1715–1718, May 1989.
Deadhar, Distributed Analyzer Architecture Permits Real–Time Monitoring of Heterogeneous Local Area Networks, IEEE, pp. 634–637, Nov. 1989.
Kuroyanagi, Adaptive and Portable TDMA Lan with a Bus Topology, IEEE, pp. 1808–1811, Dec. 1988.
Vuong, A Low Cost and Portable Local Area Network for Interconnecting PC's using Electric Power lines, IEEE, pp. 192–201, Feb. 1989.
Cole et al, An Architecture for a Mobile OSI Mail Access System, IEEE, pp. 249–256, Feb. 1989.
Satyanarayanan, A Highly Available File System for a Distributed Workstation Environment, IEEE, pp. 114–117, Sep. 1989.
Pasierb, MSE Network Control in a Mobile Environment, IEEE, pp. 869–873, Oct. 1993.

*Primary Examiner*—Thomas G. Black
*Assistant Examiner*—Frantz Coby
*Attorney, Agent, or Firm*—Foley & Lardner

[57] ABSTRACT

A portable file system capable of sharing data among various computer environments, such that a user can freely utilize his own data under various computer environments. The system includes at least one portable data processing device having a memory unit for storing file data and file management data of portable side files; at least one stationary data processing device having a processing unit for executing desired processing by making accesses to the portable side files; and a conversion unit for converting at least one of the file data and the file management data of each requested file among the portable side files for which a file access request is issued by the processing unit into a form suitable for the stationary data processing device, such that the processing unit makes an access to each requested file among the portable side files according to converted file data/file management data obtained by the conversion unit. The conversion unit may be provided in the portable data processing device side, or in the stationary data processing device side.

58 Claims, 25 Drawing Sheets

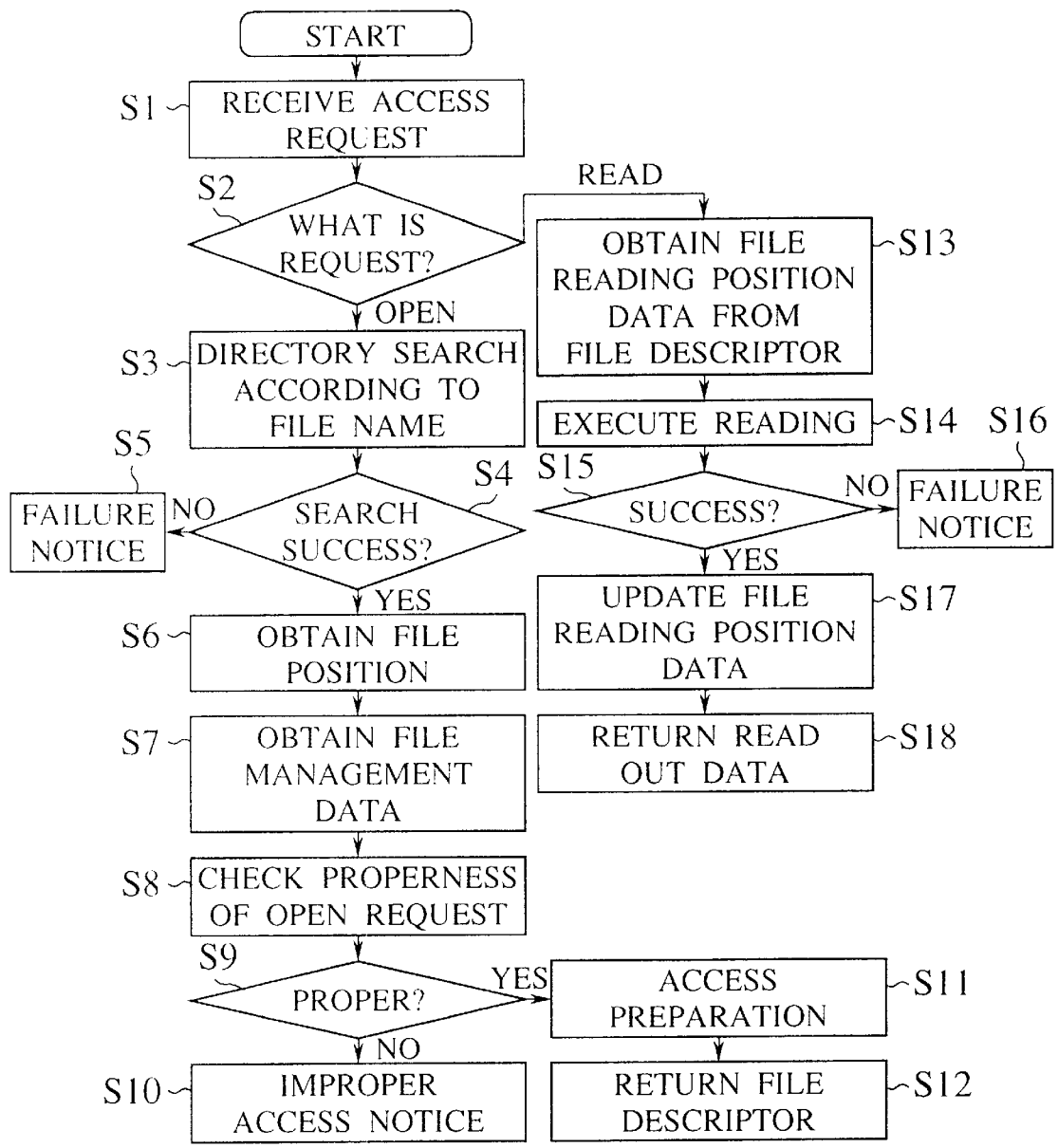

| USER NAME | USER ID | MOUNT POINT | MOUNTING TARGET POINT |
|---|---|---|---|
| kimura | 103 | / home / kimura | / PFS |
| oka | 102 | / home / oka | / PFS |
| tanaka | 104 | / home / tanaka | / PFS |
| guest | 200 | / home / guest | / PFS |

FIG. 12

| HOST NAME | STORING LOCATION | PROTECTION DATA | STORING FORMAT |
|---|---|---|---|
| WORK STATION A | /home/kimura.backup/ | R/O | tar FORMAT |
| WORK STATION B | /backup/kimura | No R/W | tar+compress FORMAT |
| PERSONAL COMPUTER D | — | — | — |

FIG. 16
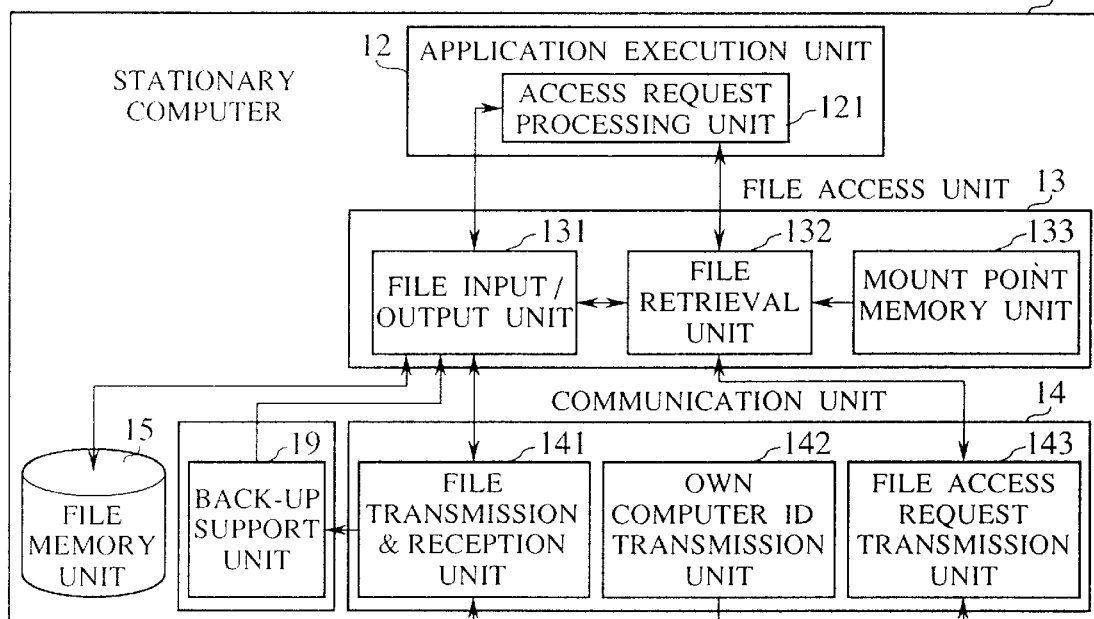
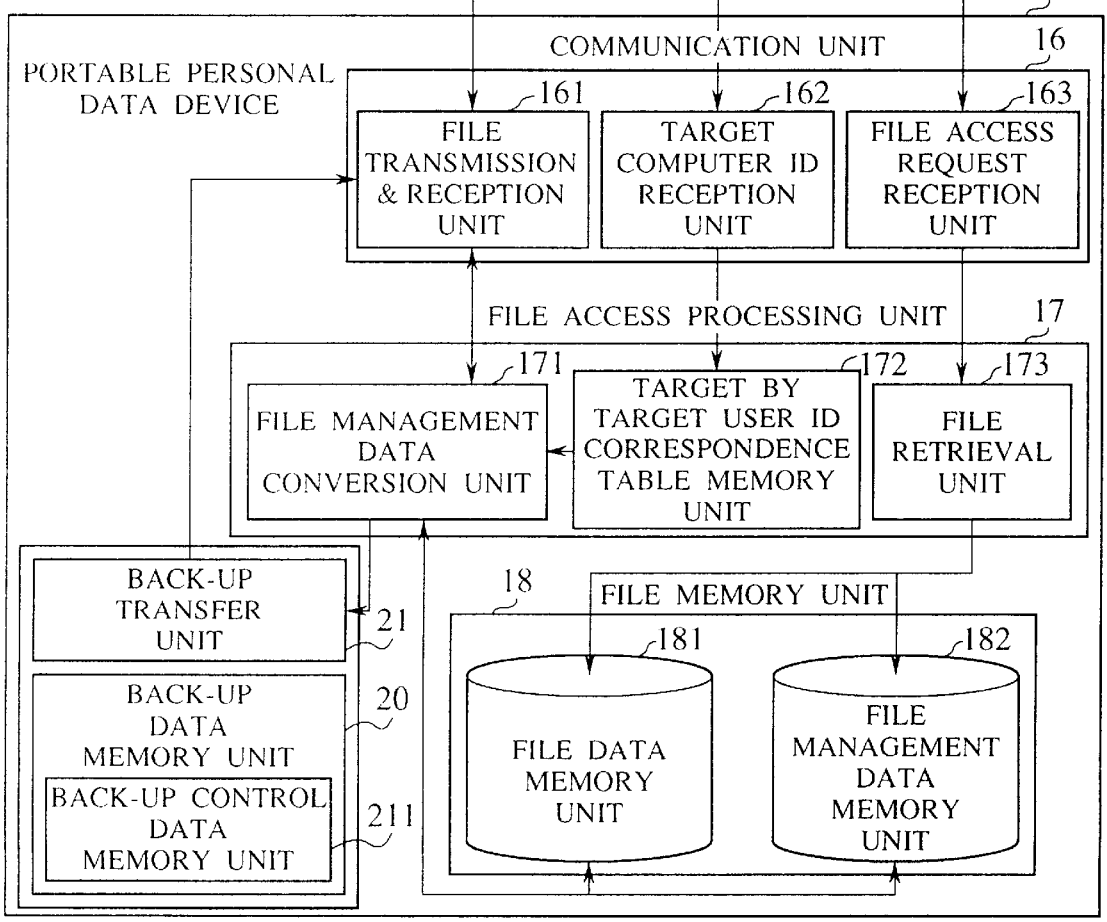

FIG. 17

| HOST NAME | BACK-UP | REGION |
|---|---|---|
| WORK STATION A | Yes | All |
| WORK STATION B | Yes | / PFS / Mail |
| PERSONAL COMPUTER D | No | — |

FIG. 21A

| WORK STATION-A | OWNER | GROUP | OTHER |
|---|---|---|---|
| / PFS / Doc / Read.Me | rw - | rw - | r - - |
| / PFS / Patent / Abstract | rw - | rw - | r - - |
| / PFS / Patent / Contents | rw - | rw - | r - - |

FIG. 21B

| WORK STATION-B | OWNER | GROUP | OTHER |
|---|---|---|---|
| / PFS / Doc / Read.Me | rw - | r - - | - - - |
| / PFS / Patent / Abstract | rw - | r - - | - - - |
| / PFS / Patent / Contents | rw - | r - - | - - - |

FIG. 21C

| OTHER MACHINES | OWNER | GROUP | OTHER |
|---|---|---|---|
| / PFS / Doc / Read.Me | rw - | - - - | - - - |
| / PFS / Patent / Abstract | rw - | - - - | - - - |
| / PFS / Patent / Contents | rw - | - - - | - - - |

FIG. 23A

| DIRECTORY POSITION = 0x104C | | | |
|---|---|---|---|
| | Machine-A | Machine-B | Others |
| Application-1 | 0x201A | 0x201B | — |
| Application-2 | 0x202A | 0x202B | — |

FIG. 23B

| DIRECTORY POSITION = 0x1050 | | | |
|---|---|---|---|
| | Machine-A | Machine-B | Others |
| Application-3 | 0x3010 | 0x4010 | — |
| Application-4 | 0x401A | 0x4020 | — |

FIG. 23C

| DIRECTORY POSITION = 0x1060 | | | |
|---|---|---|---|
| | Machine-A | Machine-B | Others |
| Application-9 | 0x5010 | 0x5500 | — |
| Application-7 | 0x400A | 0x5505 | 0x201C |

FIG. 24A

| DIRECTORY POSITION = 0x1050 ||
|---|---|
| Read. Me | 0x2000 |
| Makefile | 0x2010 |
| Application.C | 0x2003 |
| Application-3 | 0x3010 |
| Application-4 | 0x401A |

FIG. 24B

| DIRECTORY POSITION = 0x1050 ||
|---|---|
| Read. Me | 0x2000 |
| Makefile | 0x2010 |
| Application.C | 0x2003 |
| Application-3 | 0x4010 |
| Application-4 | 0x4020 |

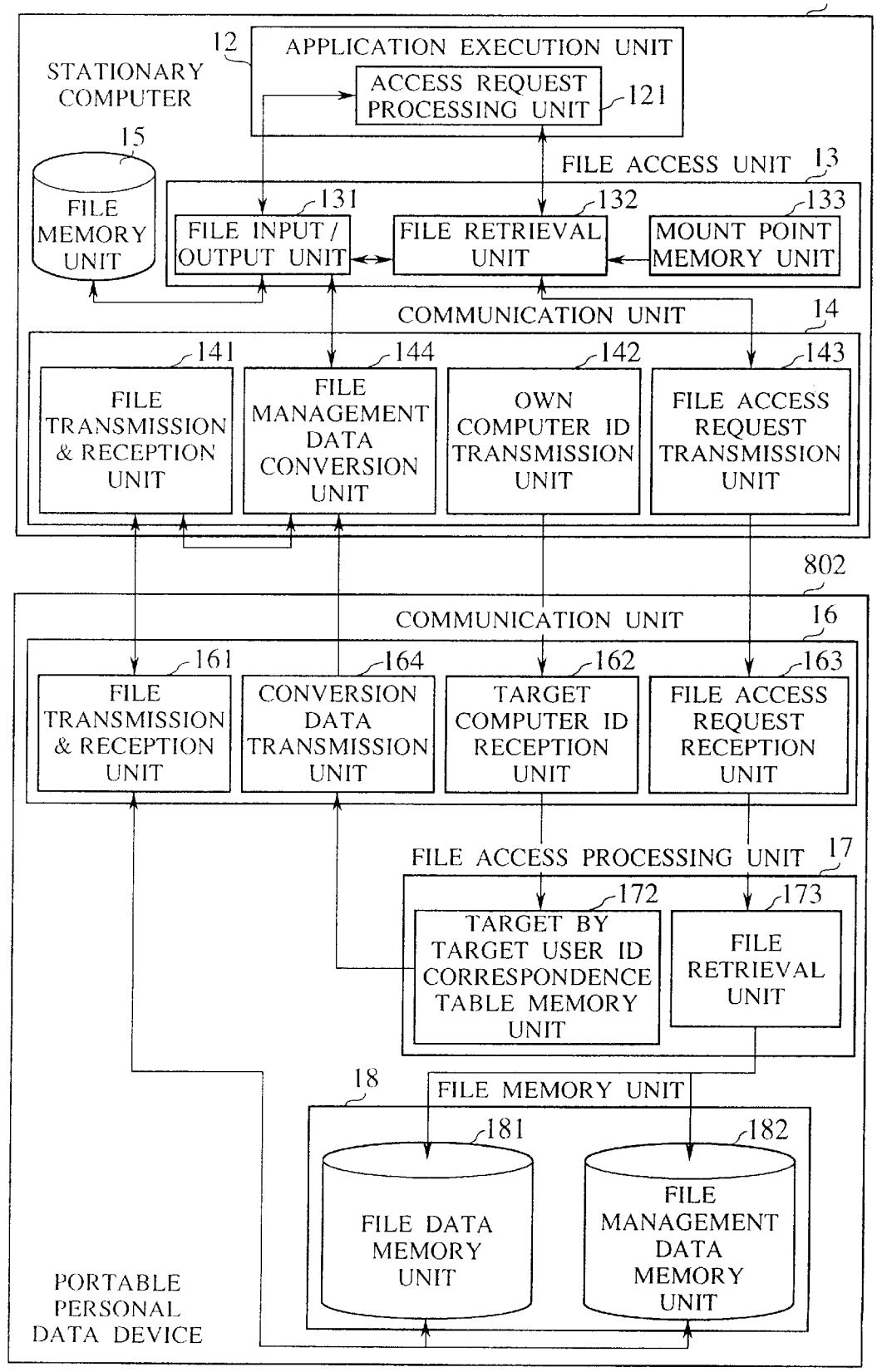

PORTABLE FILE SYSTEM OPERABLE UNDER VARIOUS COMPUTER ENVIRONMENTS

BACKGROUND OF THE INVENTION

1. Field of the Invention

The present invention relates to a portable file system in which files stored in a portable personal data device are accessible from a data processing device for executing a desired processing on data of the files.

2. Description of the Background Art

In a currently popular distributed computing environment, a plurality of work stations or personal computers are connected by the LAN (Local Area Network), and a file sharing technique such as the NFS (Network File System) developed by SUN Microsystems, Inc. is utilized to offer a network transparent distributed file system environment (i.e., an environment in which a file can be utilized without being conscious of a computer in which this file is actually stored) to the user.

The NFS also conceals a difference between different types of file systems coexisting in the distributed computing environment by a mechanism called Virtual File System Interface, so as to support a device type transparency. In this Virtual File System Interface, requests and data are exchanged between a file server side which discloses a content of its file system to another host and a client side which makes an access to a content of a file system possessed by another host, by defining a common file system interface. Each file server or client has an interface in correspondence to a file system possessed by its own host, so that in order to make a file access through a network, there is a need for a conversion with respect to a common interface at the server side as well as at the client side.

For this reason, the file system realizing the NFS has a configuration as shown in FIG. 1. In this configuration of FIG. 1, a file access request from a computer-1 1010 is given to a Virtual File System Interface 1011 on the computer-1 side first, and then, for a file in its own database 1013, the access is made through a Unix File System 1012 on the computer-1 side. On the other hand, for a file in a database 1024 of a computer-2 1020, the request is transmitted from a NFS Client 1014 on the computer-1 side through a network 1000 to a NFS Server 1021 on the computer-2 side. Then, the NFS Server 1021 issues the request to a Virtual File System Interface 1022 on the computer-2 side, from which the access is made through a Unix File System 1023 on the computer-2 side.

Now, a scale in which the above described network transparent distributed file system environment can be provided is limited by a total number of computers involved as well as by geographic or organizational constraints. For instance, the network transparent distributed file system environment is usually provided in units of a section or a research center in the case of a company, or in units of a research group or a department in the case of a university.

On the other hand, in conjunction with the wide spread use of computers, use of a computer is becoming an integral part of our work or daily life, and a situation calling for a use of a computer is more and more increasing both time-wise and location-wise. For instance, apart from daily work using a computer at a regular working spot in a company, there may be occasions to utilize computers at visiting spots for the purpose of cooperative works with other sections or other organizations, and there may be occasions to utilize a personal computer for work or amusement at home.

Despite such an expansion of situations to utilize a computer, the distributed file system can provide a network transparent file sharing only within a limited environment as described above. For instance, in the NFS including the Virtual File System Interface, it is impossible to share a file among different environments in which the user management data are different (e.g., environments in which different users are assigned to the same user ID).

For this reason, conventionally, a separate file management has been required at each computer environment, e.g., at a working spot, at a visiting spot, and at home. As a consequence, when a certain file is to be shared among these environments, a user can realize such a sharing only by copying this file by utilizing a floppy disk or a communication line. However, in this mode of realizing the file sharing, the user is required to endure the tediousness of carrying out cumbersome copying operations to make copies as well as a careful file management in order to maintain the consistency among the copies, and in addition, the user is held responsible for a considerable risk of data loss resulting from a file management error.

SUMMARY OF THE INVENTION

It is therefore an object of the present invention to provide a portable file system capable of sharing data among various computer environments, without requiring a user to be conscious of differences in computer device type or environment and without demanding a user to spend considerable efforts in copying data and maintaining a consistency among the copied data, such that a user can freely utilize his own data under various computer environments.

According to one aspect of the present invention there is provided a portable file system, comprising: at least one portable data processing device having memory means for storing file data and file management data of portable side files (i.e., portable device files belonging to the portable data processing device); at least one stationary data processing device having processing means for executing desired processing by making accesses to the portable side files; and conversion means for converting at least one of the file data and the file management data of each requested file among the portable side files for which a file access request is issued by the processing means into a form suitable for the stationary data processing device, such that the processing means makes an access to each requested file among the portable side files according to converted file data/file management data obtained by the conversion means.

According to another aspect of the present invention there is provided a portable file system, comprising: a portable data processing device having memory means for storing files; and a stationary data processing device having processing means for executing desired processing by making accesses to the files stored in the memory means and control means for controlling an execution of the processing by the processing means depending on who is operating the processing means; wherein the portable data processing device includes means for returning a user ID valid on the stationary data processing device of an owner of each requested file for which a file access request is issued by the processing means, to the stationary data processing device, in response to the file access request received from the stationary data processing device; and the control means controls the execution of the processing by the processing means according to the user ID returned from the portable data processing device.

According to another aspect of the present invention there is provided a portable file system, comprising: a portable data processing device having memory means for storing files; and a stationary data processing device having processing means for executing desired processing by making accesses to the files stored in the memory means and control means for controlling an execution of the processing by the processing means depending on an access permit/reject data of each file; wherein the portable data processing device includes means for returning an access permit/reject data valid on the stationary data processing device for each requested file for which a file access request is issued by the processing means, to the stationary data processing device, in response to the file access request received from the stationary data processing device; and the control means controls the execution of the processing by the processing means according to the access permit/reject data returned from the portable data processing device.

According to another aspect of the present invention there is provided a portable data processing device to be used in conjunction with a stationary data processing device, comprising: memory means for storing file data and file management data of files; and conversion means for converting at least one of the file data and the file management data of each requested file for which a file access request is received from the stationary data processing device into a form suitable for the stationary data processing device, and returning converted file data/file management data to the stationary data processing device in response to the file access request such that the stationary data processing device makes an access to each requested file according to converted file data/file management data returned from the portable data processing device.

According to another aspect of the present invention there is provided a portable data processing device to be used in conjunction with a stationary data processing device, comprising: memory means for storing file data and file management data of files; and conversion control means for controlling the stationary data processing device to convert at least one of the file data and the file management data of each requested file for which a file access request is received from the stationary data processing device into a form suitable for the stationary data processing device, by transmitting conversion data necessary in converting said at least one of the file data and the file management data at the stationary data processing device in response to the file access request, such that the stationary data processing device makes an access to each requested file according to converted file data/file management data obtained by using the conversion data.

According to another aspect of the present invention there is provided a stationary data processing device to be used in conjunction with a portable data processing device, comprising: processing means for executing desired processing by making accesses to portable side files stored in the portable data processing device; and conversion means for converting at least one of file data and file management data of each requested file among the portable side files for which a file access request is issued by the processing means into a form suitable for the stationary data processing device, according to conversion data necessary in converting said at least one of the file data and the file management data provided by the portable data processing device in response to the file access request, such that the processing means makes an access to each requested file according to converted file data/file management data obtained by the conversion means.

According to another aspect of the present invention there is provided a portable data processing device to be used in conjunction with a network to which a stationary data processing device is connected, comprising: memory means for storing file data and file management data of files; and conversion means for converting at least one of the file data and the file management data of each requested file for which a file access request is received from the stationary data processing device via the network into a form suitable for the network, and returning converted file data/file management data to the stationary data processing device via the network in response to the file access request such that the stationary data processing device makes an access to each requested file according to converted file data/file management data returned from the portable data processing device.

According to another aspect of the present invention there is provided a method of file data processing, comprising the steps of, forming a portable file system of at least one portable data processing device having memory means for storing file data and file management data of portable side files, and at least one stationary data processing device having processing means for executing desired processing by making accesses to the portable side files; issuing a file access request for each requested file among the portable side files from the processing means; converting at least one of the file data and the file management data of each requested file among the portable side files for which a file access request is issued by the processing means into a form suitable for the stationary data processing device, at conversion means; and making an access to each requested file among the portable side files at the processing means according to converted file data/file management data obtained by the conversion means.

According to another aspect of the present invention there is provided a method of file data processing, comprising the steps of: forming a portable file system of a portable data processing device having memory means for storing files, and a stationary data processing device having processing means for executing desired processing by making accesses to the files stored in the memory means and control means for controlling an execution of the processing by the processing means depending on who is operating the processing means; issuing a file access request for each requested file among the files stored in the memory means from the processing means; returning a user ID valid on the stationary data processing device of an owner of each requested file for which a file access request is issued by the processing means, from the portable data processing means to the stationary data processing device, in response to the file access request received from the stationary data processing device; and controlling the execution of the processing by the processing means according to the user ID returned from the portable data processing device.

According to another aspect of the present invention there is provided a method of file data processing, comprising the steps of: forming a portable file system of a portable data processing device having memory means for storing files, and a stationary data processing device having processing means for executing desired processing by making accesses to the files stored in the memory means and control means for controlling an execution of the processing by the processing means depending on an access permit/reject data of each file; issuing a file access request for each requested file among the files stored in the memory means from the processing means; returning an access permit/reject data valid on the stationary data processing device for each requested file for which a file access request is issued by the processing means, from the portable data processing device to the stationary data processing device, in response to the file access request received from the stationary data processing device; and controlling the execution of the processing by the processing means according to the access permit/reject data returned from the portable data processing device.

According to another aspect of the present invention there is provided an article of manufacture, comprising: a computer usable medium having computer readable program code means embodied therein for causing a computer to function as a portable personal data device to be used in conjunction with a stationary data processing device, the computer readable program means including: first computer readable program code means for causing the computer to store a correspondence between an ID of each stationary data processing device and a file management data suitable for each stationary data processing device; and second computer readable program code means for causing the computer to receive the ID of the stationary data processing device which issued a file access request; and third computer readable program code means for causing the computer to convert a file management data of each requested file for which the file access request is received from the stationary data processing device into a form suitable for the stationary data processing device by referring to the correspondence stored by the first computer readable program code means according to the ID of the stationary data processing device received by the second computer readable program code means, and to return converted file management data to the stationary data processing device in response to the file access request such that the stationary data processing device makes an access to each requested file according to converted file management data returned from the computer.

Other features and advantages of the present invention will become apparent from the following description taken in conjunction with the accompanying drawings.

BRIEF DESCRIPTION OF THE DRAWINGS

FIG. 4 is a flow chart for an exemplary file access operation at a stationary computer in the portable file system of FIG. 3.

FIG. 5 is a diagrammatic illustration of a table content stored at a target by target user ID correspondence table memory unit of a portable personal data device in the portable file system of FIG. 3.

FIG. 12 is a diagrammatic illustration of a table content stored at a back-up data memory unit of a portable personal data device in the portable file system of FIG. 11.

FIG. 16 is a detailed block diagram of a sixth embodiment of a portable file system according to the present invention.

FIG. 17 is a diagrammatic illustration of a table content stored at a back-up control data memory unit of a portable personal data device in the portable file system of FIG. 16.

FIGS. 21A to 21C are diagrammatic illustrations of a table content stored at a target by target access permit/reject data correspondence table memory unit of a portable personal data device in the portable file system of FIG. 20.

FIGS. 23A to 23C are diagrammatic illustrations of a table content stored at a target by target access file memory position correspondence table memory unit of a portable personal data device in the portable file system of FIG. 22.

FIGS. 24A and 24B are diagrammatic illustrations of a directory content for a certain directory in the portable file system of FIG. 22 before and after file memory position conversion.

FIG. 25 is a detailed block diagram of an eleventh embodiment of a portable file system according to the present invention.

DETAILED DESCRIPTION OF THE PREFERRED EMBODIMENTS

Now, various embodiments of a portable file system according to the present invention will be described in detail.

Figure 1:
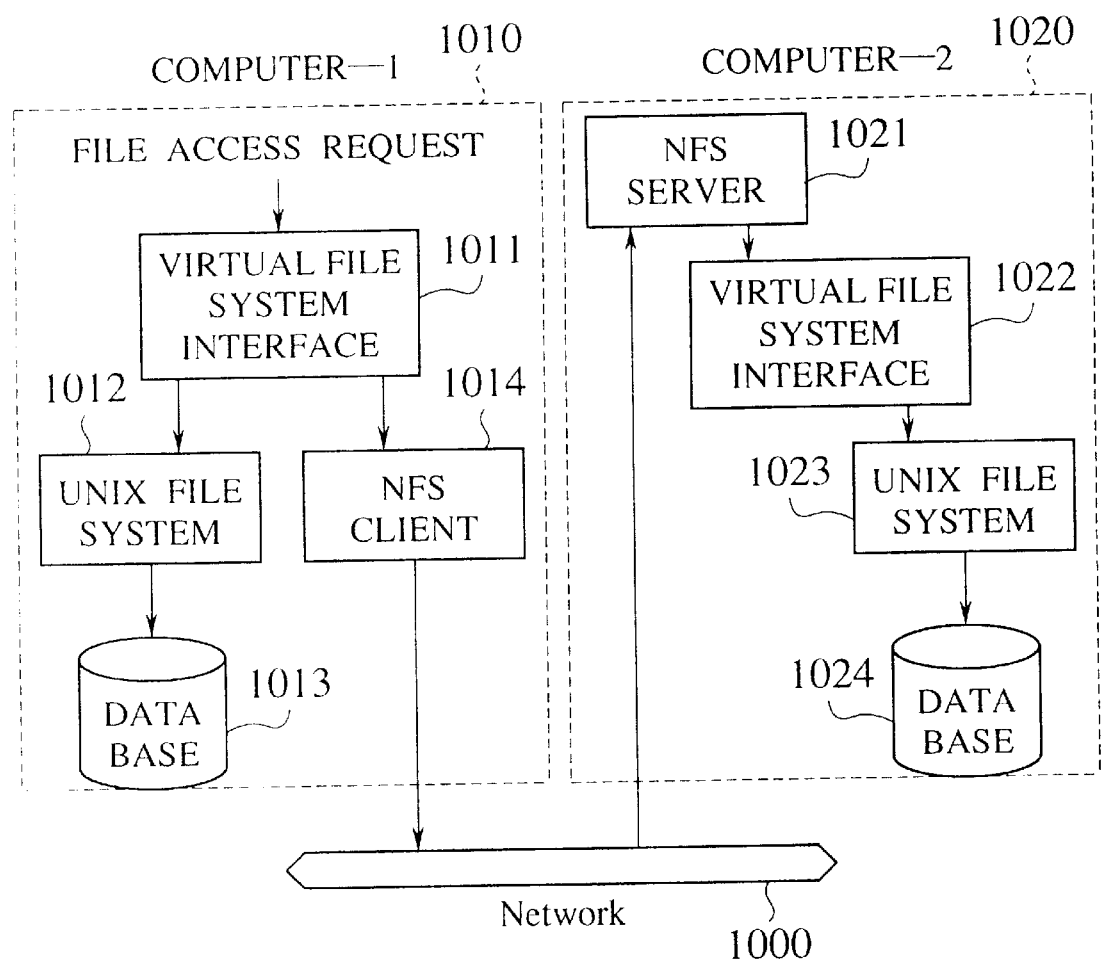
FIG. 1 is a schematic block diagram of one example of a conventional file system.
Figure 2:
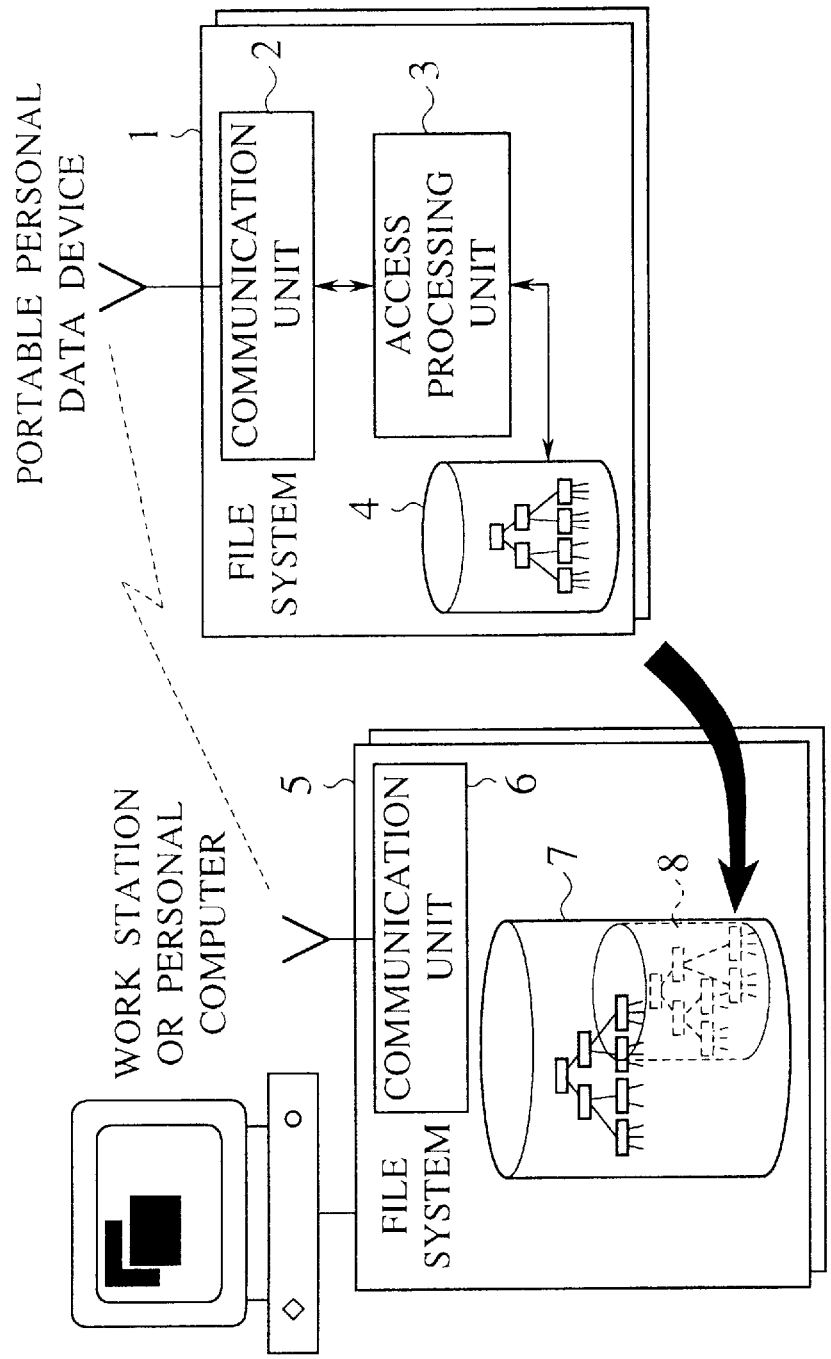
FIG. 2 is a schematic block diagram of a conceptual configuration of a portable file system according to the present invention.

First, the portable file system of the present invention has a schematic conceptual configuration as shown in FIG. 2, which comprises: a portable personal data device 1 having a communication unit 2, an access processing unit 3, and a file system 4; and a stationary computer 5 such as a work station or a personal computer having a communication unit 6 and a file system 7.

In the existing computer environment, the personal files of each user have been stored at each work station or personal computer independently. In contrast, in the portable file system of the present invention, a user keeps the personal files in the large capacity file system 4 provided in his own portable personal data device 1 for exclusive use by this user. The user always carries this portable personal data device 1 along with him, and at a time of utilizing the stationary computer 5 such as a work station or a personal computer, the user places this portable personal data device 1 in a vicinity of the stationary computer 5. The portable personal data device 1 and the stationary computer a are equipped with the communication units 2 and 6 for communicating with each other by a radio or on-line communication mode, as well as a mechanism for making the file system 4 of the portable personal file system 4 as if it is a part 8 of the file system 7 of the stationary computer 5 located nearby.

In this portable file system, the portable personal data device 1 and the stationary computer 5 may be using different user management data, so that the portable personal data device 1 is further equipped with a mechanism for judging a difference in the user management data automatically, and adapting the file management data such that a file in this portable personal data device 1 can be correctly recognized as a file of the owner of this portable personal data device 1 from a standpoint of the stationary computer 5. In addition, the user's working environment (equivalent of the Home Directory in the Unix) is set up in advance at a specific location in the file system 4 of the portable personal data device 1.

In this manner, the user can utilize any stationary computer 5 by simply placing the portable personal data device 1 carried along with him in a vicinity of this stationary computer 5, even if this stationary computer 5 is not his home machine that he usually uses and there is no way of communicating with his home machine, as all the necessary personal data are kept in the portable personal data device 1 at hand and they can be handled as if they are stored in the stationary computer 5 in front of him.

In addition, when the user has no stationary computer such as a work station or a personal computer readily available to him during a travelling or at a visiting spot, it is still possible for the user to look up or update his personal data stored in the portable personal data device 1 by utilizing an input/output function provided in the portable personal data device 1.

Further details concerning the portable personal data device and the stationary computer in such a portable file system of the present invention will be described more specifically in the following specific embodiments Referring now to FIG. 3 to FIG. 10, a first specific embodiment of a portable file system according to the present invention will be described in detail.

Figure 3:
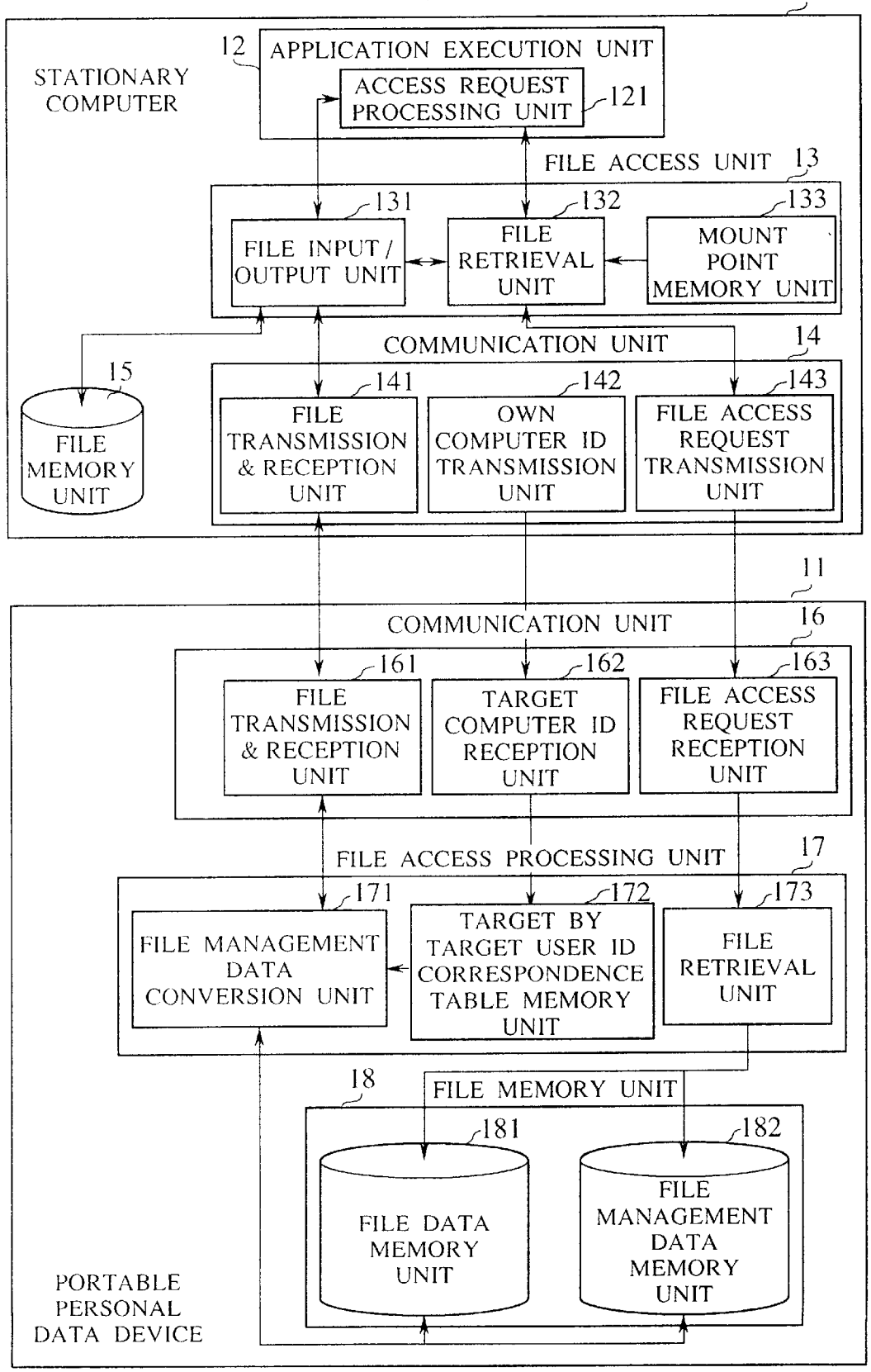
FIG. 3 is a detailed block diagram of a first embodiment of a portable file system according to the present invention.

In this first embodiment, the portable file system has a configuration as shown in FIG. 3, which generally comprises: a stationary computer 10 having an application execution unit 12, a file access unit 13, a communication unit 14, and a file memory unit 15; and a portable personal data device 11 having a communication unit 16, a file access processing unit 17, and a file memory unit 18.

First, an internal configuration of the stationary computer 10 will be described. In this stationary computer 10, the application execution unit 12 is connected with the file access unit 13, and the file access unit 13 is also connected with the file memory unit 15, while the communication unit 14 is connected with the file access unit 13 as well as with the communication unit 16 of the portable personal data device 11.

The file memory unit 15 stores a file system of this stationary computer 10 formed by a plurality of files, using a file as a unit of data storage. The individual file is attached with file management data (owner, time data such as a creation time, access right data, etc.). In addition, the file memory unit 15 also stores a special type of files called directories which indicate correspondences between file storage position data and file names, in the same manner as the other files.

The application execution unit 12 has an access request processing unit 121 which issues a data access request and a file retrieval request.

The file access unit 13 comprises a file input/output unit 131, a file retrieval unit 132, and a mount point memory unit 133. The file input/output unit 131 carries out a reading or a writing of data at a specified position in the file memory unit 15 according to the data access request issued by the access request processing unit 121 of the application execution unit 12, and returns the read out data to the access request processing unit 121 when the data access request is for reading of the data. The file retrieval unit 132 receives the file retrieval request issued by the access request processing unit 121, and looks up the directory stored in the file memory unit 15 to obtain a storage position of the requested file in the file memory unit 15 according to the file name of the requested file. The mount point memory unit 133 stores a Junction between two file memory units at a time of connecting the file memory unit 15 with the file memory unit 18 of the portable personal data device 11 to realize a mechanism to make these two file memory units appear as if they are virtually a single file memory unit.

The communication unit 14 provides a function for communicating with the communication unit 16 of the portable personal data device 11 in order to cooperate with the portable personal data device 11 to handle an access request with respect to a file stored in the file memory unit 18 of the portable personal data device 11 smoothly. This communication unit 14 comprises a file transmission and reception unit 141, an own computer ID transmission unit 142, and a file access request transmission unit 143. The file access request transmission unit 143 transfers the file access request from the file retrieval unit 132 to the communication unit 16 of the portable personal data device 11 whenever the issued file access request is judged as a request with respect to a file stored in the file memory unit 18 of the portable personal data device 11. The file transmission and reception unit 141 carries out a transmission or a reception of data with respect to the communication unit is of the portable personal data device 11 in order to realize a reading or a writing with respect to a file stored in the file memory unit 18 of the portable personal data device 11. The own computer ID transmission unit 142 transmits a computer ID of this stationary computer 10 to be used by the portable personal data device 11 in identifying this stationary computer 10 communicating with the portable personal data device 11, to the communication unit 16 of the portable personal data device 11.

Here, a file access operation in this stationary computer 10 will be described for an exemplary case in which a certain application reads a content of a certain file stored in the file memory unit 15. In this case, the stationary computer 10 operates according to the flow chart of FIG. 4 as follows.

At a time of starting an access with respect to a certain file, an application executed by the application execution unit 12 issues an open request along with a file name and an access attribute. When an access request is received from the application (S1), the access request processing unit 121 judges whether the received access request is an open request or a read request according to the received access attribute (S2). When the received request is an open request, the access request processing unit 121 sends the file name to the file retrieval unit 132 to check the position of the file in the file memory unit 15, and in response, the file retrieval unit 132 looks up the directory through the file input/output unit 131 to search out the position of the file for the received file name (S3).

When the requested file is not found out (S4 NO), the file retrieval unit 132 returns a failure notice to the application through the access request processing unit 121 (S5). On the other hand, when the requested file is found out (S4 YES), the file retrieval unit 132 returns the obtained file position to the access request processing unit 121 (S6). Then, the access request processing unit 121 obtains the file management data for the requested file from the file memory unit 15 through the file input/output unit 131 (S7). and then judges whether this open request is a proper one or not according to the obtained file management data (S8).

When it is judged as an improper open access (S9 NO), the access request processing unit 121 notifies an improper access notice to the application (S10). On the other hand, when it is judged as a proper open access (S9 YES), the access request processing unit 121 carries out an access preparation for subsequent access operation, such as an initial setting of the received file position data as a position data for subsequent reading or writing operation, a creation of an access management data and an assignment of a file descriptor to the created access management data (S11), and then the access request processing unit 121 returns a file descriptor to the application (S12).

When the open request is accepted, the application issues a read request with a file descriptor as an argument in order to read out the file content. When this request is received and judged as the read request (S1, S2), the access request processing unit 121 obtains the file reading position data from the file descriptor (S13), and sends the read request to the file input/output unit 131 according to the obtained reading position data. In response, the file input/output unit 131 executes the reading from the specified file position in the file memory unit 15 (S14).

When this reading is unsuccessful (S15 No), the file input/output unit 131 returns a failure notice to the application through the access request processing unit 121 (S16). On the other hand, when this reading is successful (S15 YES), the access request processing unit 121 updates the reading position data as a preparation to the subsequent reading operation (S17), and the file input/output unit 131 returns the read out data for the requested file to the application through the access request processing unit 121 (S18).

Next, an internal configuration of the portable personal data device 11 will be described. In this portable personal data device 11, the communication unit 16 is connected with the file access processing unit 17 as well as with the communication unit 14 of the stationary computer 10, while the file access processing unit 17 is also connected with the file memory unit 18.

The communication unit 16 comprises a file transmission and reception unit 161, a target computer ID reception unit 162, and a file access request reception unit 163, which communicate with the file transmission and reception unit 141, the own computer ID transmission unit 142, and the file access request transmission unit 143 of the communication unit 14 in the stationary computer 10, respectively, so as to realize a cooperative operation of the portable personal data device 11 and the stationary computer 10.

The file access processing unit 17 comprises a file management data conversion unit 171, a target by target user ID correspondence table memory unit 172, and a file retrieval unit 173. The file retrieval unit 173 has the same function as the file retrieval unit 132 in the file access unit 13 of the stationary computer 10, which obtains the file memory position on the portable personal data device 11 by looking up the directory data in the file memory unit 18 according to a file name transmitted from the stationary computer 10.

The target by target user ID correspondence table memory unit 172 manages a correspondence table registering a computer ID of each connection target computer and a user ID of the owner of this portable personal data device 11 on each connection target computer, and determines the user ID corresponding to the computer ID obtained from the stationary computer 11 at the target computer ID reception unit 162 and transmits the determined user ID to the file management data conversion unit 171, in order to deal with cases in which the user ID of the owner of this portable personal data device 11 is different for different connection target stationary computers. In addition, the target by target user ID correspondence table memory unit 172 also manages another correspondence table registering a computer ID of each connection target computer and a type of file system in each connection target computer, and determines the type of file system corresponding to the computer ID obtained from the stationary computer 11 at the target computer ID reception unit 162 and transmits the determined type of file system to the file management data conversion unit 171, in order to deal with cases in which the data structure of the file management data is different at different connection target stationary computers. Here, the correspondence table for the user ID and the correspondence table for the type of file system may be provided either separately or integrally.

The file memory unit 18 stores file data as well as file management data such as position data and protection data for files and time data regarding creation/correction of files. In this first embodiment, the file memory unit 18 comprises a file data memory unit 181 and a file management data memory unit 182, where the file data memory unit 181 functions as a pure data memory unit for storing the file data without any management data or position data, while the file management data memory unit 182 functions as a memory unit for the file management data such as the position data, the protection data, and the time data for the files stored in the file data memory unit 181. Here, the file data memory unit 181 and the file management data memory unit 182 may be provided either separately or integrally in terms of physical memory elements.

The file management data conversion unit 171 has a function for converting the file management data such as the owner of the file and the protection data for the file stored in the file management data memory unit 182 into file management data suitable for the connection target stationary computer, according to the user ID obtained from the target by target user ID correspondence table memory unit 172. In addition, in a case the data structure of the file management data is different, the file management data conversion unit 171 also converts the data structure of the file management data stored in the file management data memory unit 182 into a data structure suitable for the connection target stationary computer, according to the type of file system obtained from the target by target user ID correspondence table memory unit 172.

Here, suppose that the user ID of a certain user is "105" on a certain stationary computer-A, and "309" on another stationary computer-B. When the portable personal data device 11 of this user is connectable to either one of these stationary computers, the file management data assigned to the files in this portable personal data device 11 cannot include data which are only valid on a particular stationary computer alone such as "105" and "309" as the user ID of this user.

For this reason, the data which vary according to the environment such as OS, user ID, group ID, etc. are stored in the target by target user ID correspondence table memory unit 172 of this portable personal data device 11, in a form shown in FIG. 5 for each host. In the file access processing unit 17 of this portable personal data device 11, the connection target stationary computer is identified according to the target computer ID obtained at the target computer ID reception unit 162 at a time of mounting, and the data corresponding to the connection target are obtained from the target by target user ID correspondence table memory unit 172. Thereafter, in response to the file management data access request made by the connected stationary computer for the purpose of checking the file access right, the file management data conversion unit 171 in the file access processing unit 17 of this portable personal data device 11 converts the file management data of the requested file into a form suitable to the connected stationary computer according to the data corresponding to this connected stationary computer such as the user ID, and returns the converted file management data to the connected stationary computer 11 through the file transmission and reception unit 161.

It is noted here that the file management data memory unit 182 may store the file management data in terms of the user ID uniquely assigned in the portable personal data device 11 in advance, such that this user ID is replaced at a time of the file management data conversion according to the data stored in the target by target user ID correspondence table memory unit 172, or the file management data memory unit 182 may store the file management data in terms of the user ID entries which are left blank, such that the appropriate user ID is inserted at a time of the file management data conversion according to the data stored in the target by target user ID correspondence table memory unit 172.

In the following, a system formed by the rile access processing unit 17 and the file memory unit 18 including the file data memory unit 181 and the file management data memory unit 182 will be referred as a file system.

In general, the file system provided in the UNIX, etc. has a mechanism called mounting of file systems for connecting a plurality of file systems together. This mechanism operates to connect spaces of names (given to the files) owned by the individual file systems together according to a certain rule. This mounting mechanism to be realized between the stationary computer 10 and the portable personal data device 11 in this first embodiment will now be described in detail, with regards to the mounting procedure indicated by the flow chart of FIG. 6 and the access to the mounted portable personal data device file system.

Namely, the mounting of the file system of the portable personal data device 11 to the file system of the stationary computer 10 is carried out according to the flow chart of FIG. 6 as follows.

When a communication path between the stationary computer 10 and the portable personal data device 11 is established, the stationary computer 10 transmits its own computer ID to the portable personal data device 11 (S21) Then, the portable personal data device 11 obtains the user ID of the owner of this portable personal data device 11 on that stationary computer 10 from the target by target user ID correspondence table memory unit 172, and transmits the obtained user ID to the stationary computer 10 (S22).

Here, the stationary computer 10 has the mount point memory unit 133 for storing a mount point for the portable file system that is set up in advance for each user owning the portable personal data device 11, where this mount point memory unit 133 may be provided collectively for all the users or distributedly for each user in the stationary computer 10.

Figures 6, 7:
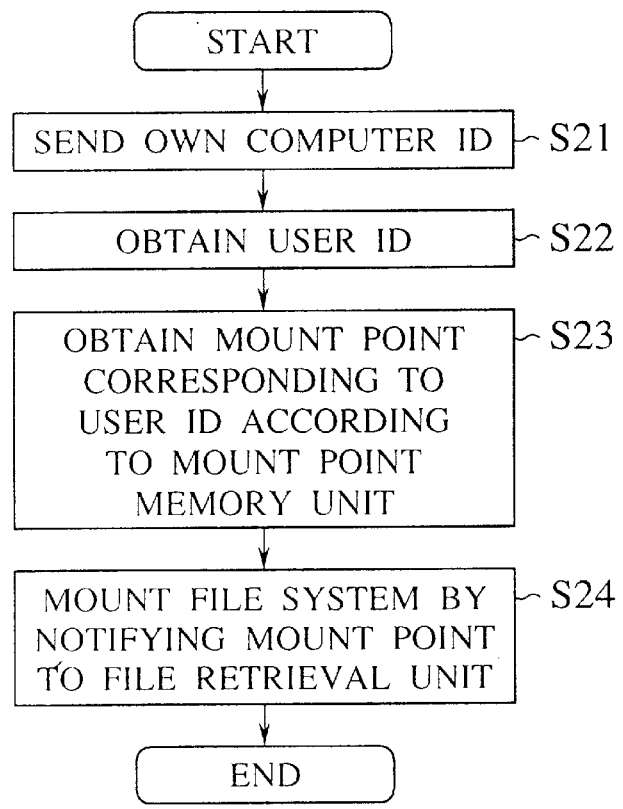
FIG. 6 is a flow chart for an operation for mounting a file system of a portable personal data device to a file system of a stationary computer in the portable file system of FIG. 3.
FIG. 7 is a diagrammatic illustration of a table content stored at a mount point memory unit of a stationary computer in the portable file system of FIG. 3.

This mount point memory unit 133 has a table as shown in FIG. 7, which registers a user ID, a mount point, and a mounting target point indicating which portion of the file system of the portable personal data device is to be mounted, for each user.

After the user ID is obtained from the portable personal data device 11, the stationary computer 10 determines the mount point corresponding to the obtained user ID by looking up the mount point memory unit 133 (S23), and mounts the file system of the portable personal data device 11 to the determined mount point by notifying the determined mount point to the file retrieval unit 132 (S24).

After this mounting operation, the access to the files of the mounted portable file system on the stationary computer 10 is carried out as follows.

Figure 8A:
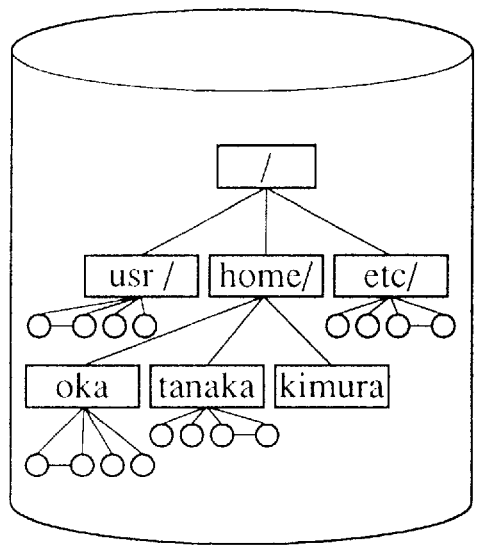
FIGS. 8A to 8C are diagrammatic illustrations of file systems in a stationary computer and a portable personal data device before mounting, and a file system in a stationary computer after mounting, respectively.
Figure 8B:
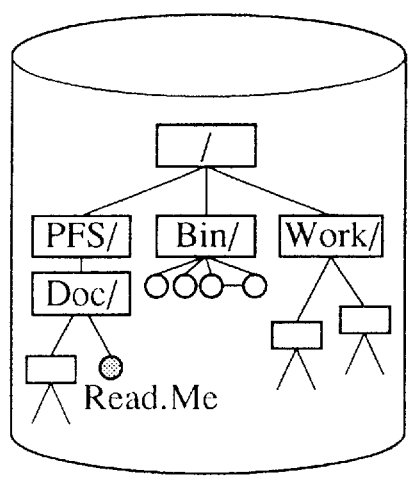
Figure 8C:
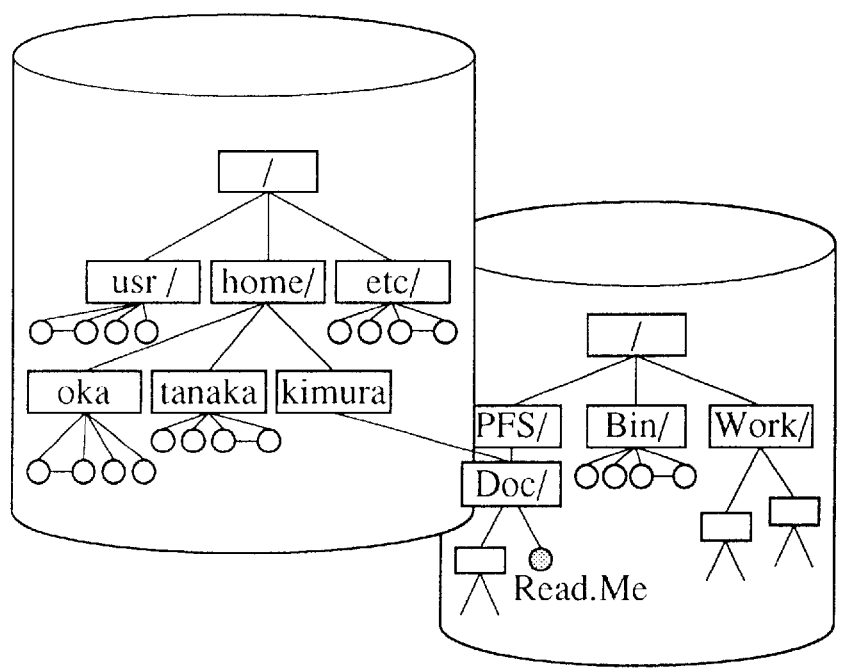

Here, an exemplary case in which the file system of the portable personal data device 11 as shown in FIG. 8B is mounted to the file system of the stationary computer 10 as shown in FIG. 8A at the mounting point "/home/kimura/" in a form as shown in FIG. 8C will be described. In these FIGS. 8A to 8C, rectangular blocks represent directories while circular blocks represent files. In this case, when the mounting is carried out, from a point of view of the user on the stationary computer 10, these file systems of FIG. 8A and FIG. 8B appear as if they are unified as shown in FIG. 8C.

Figure 9A:
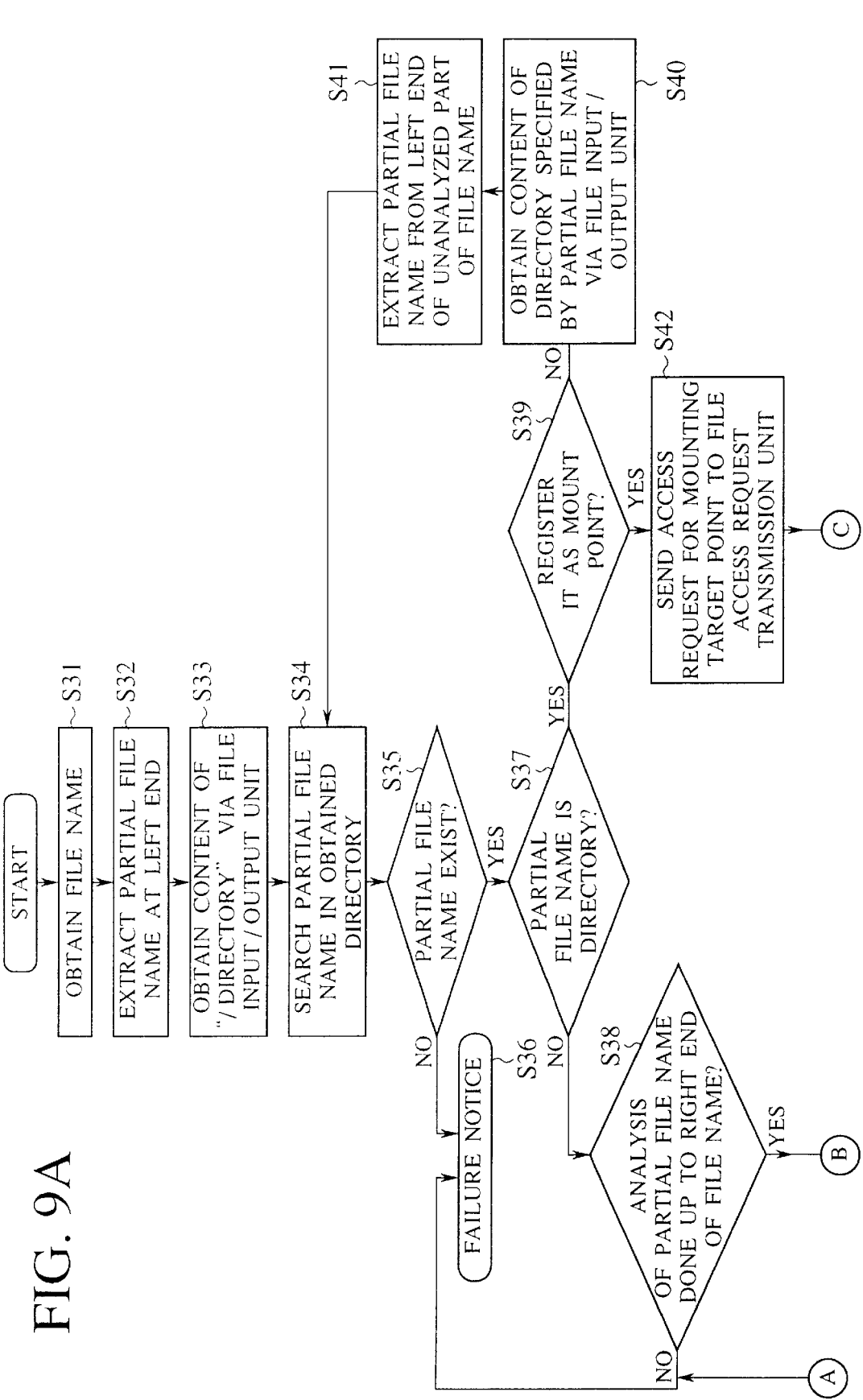
FIGS. 9A and 9B are a flow chart for an operation of a stationary computer in the portable file system of FIG. 3 for a file access after mounting.
Figure 9B:
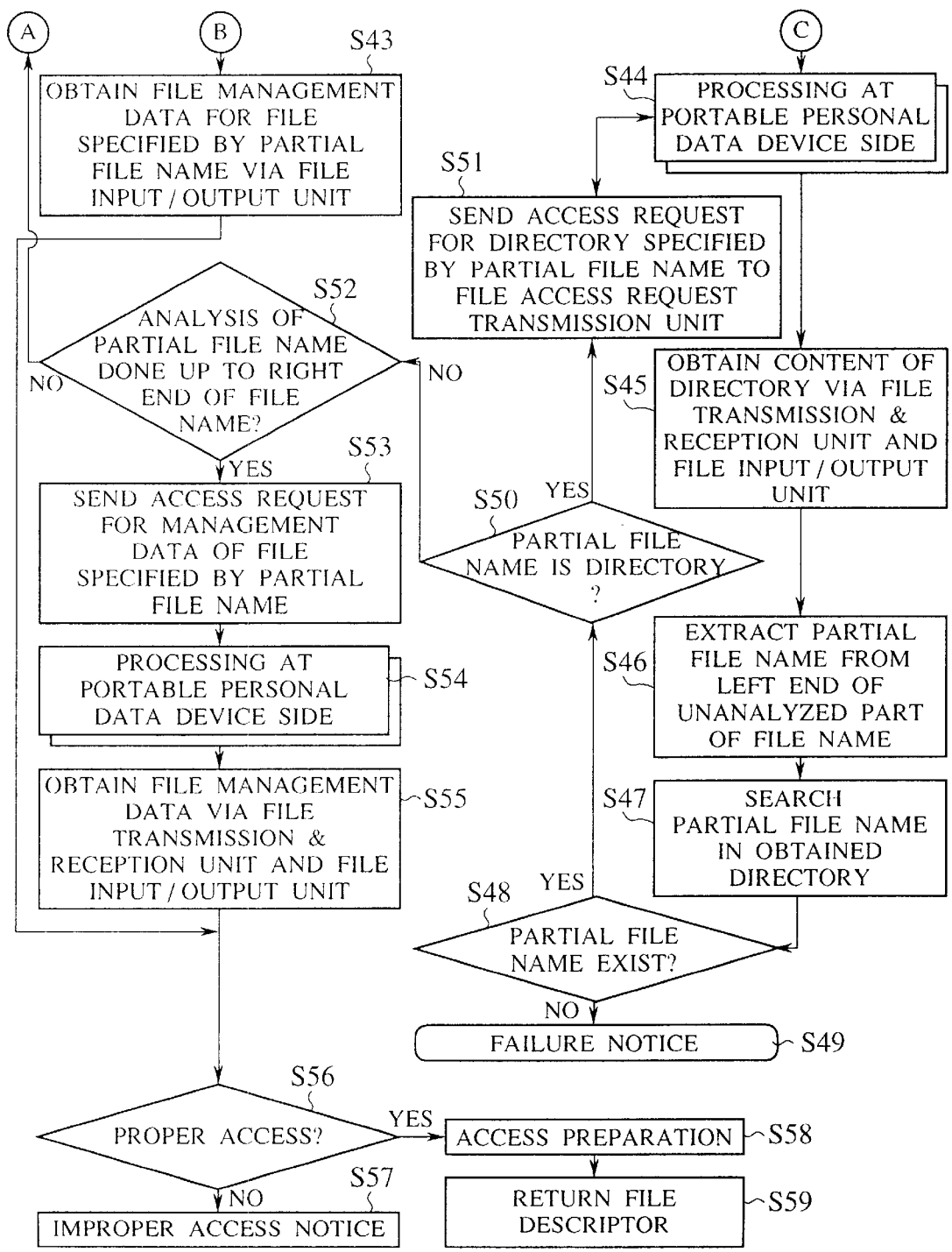
Figure 10:
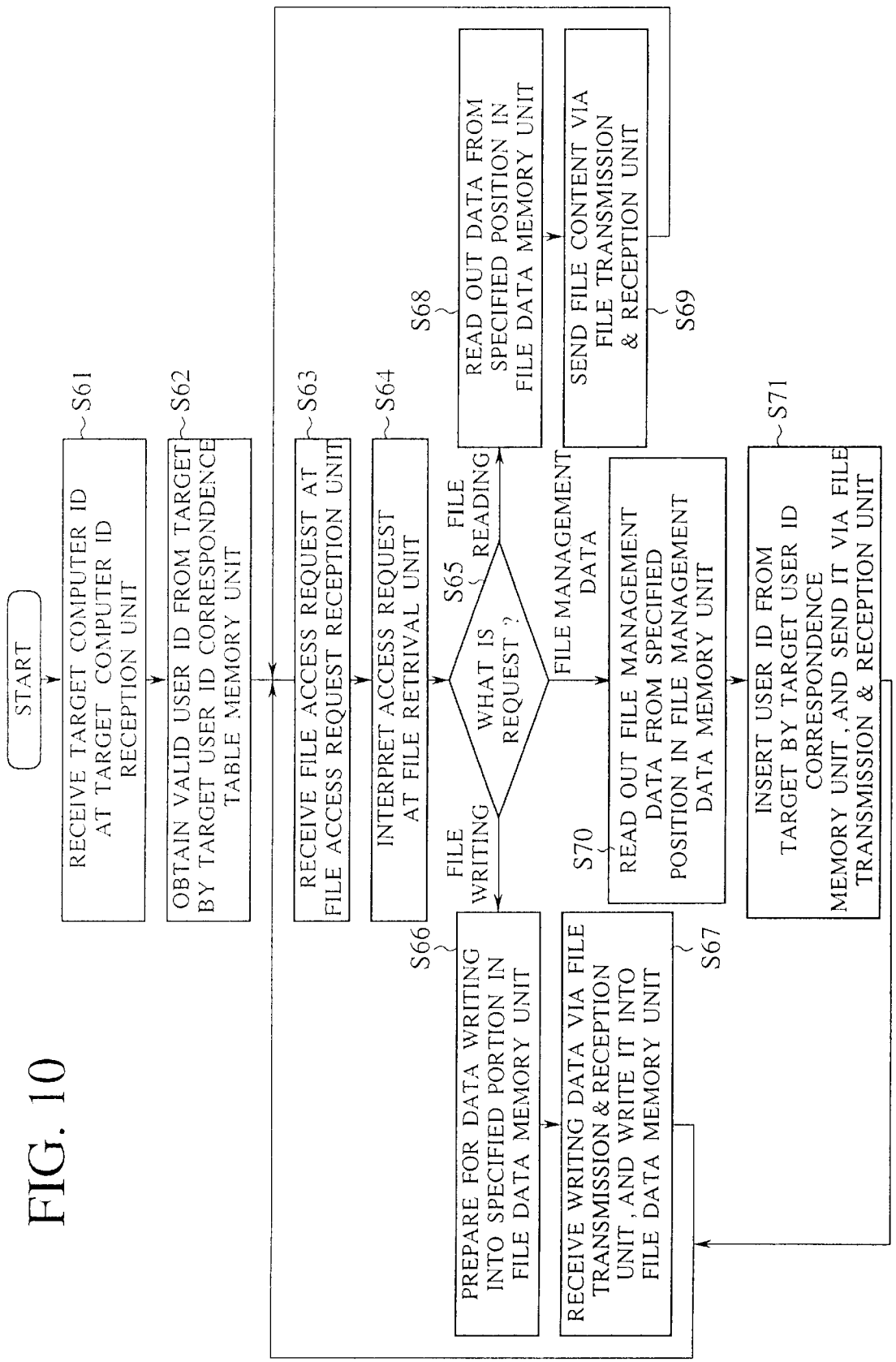
FIG. 10 is a flow chart for an operation of a portable personal data device in the portable file system of FIG. 3 for a file access after mounting.

Then, in an exemplary case in which a process executed on the stationary computer 10 makes an access to a file (which is assumed to be "/PFS/Doc/Read.Me" here) on the portable personal data device 11, the stationary computer 10 operates according to the flow chart of FIG. 9A and FIG. 9B, while the portable personal data device 11 operates according to the flow chart of FIG. 10. In this case, the file system of the portable personal data device 11 which has this file is mounted in the file system of the stationary computer 10 as indicated in FIG. 8C, so that this file is recognized as "/home/kimura/Doc/Read.Me" at the stationary computer 10 side.

First, when an access request for this file "/home/kimura/Doc/Read.Me" is issued at the application execution unit 12 on the stationary computer 10, the file retrieval unit 132 in the file access unit 13 of the stationary computer 10 receives this access request and obtains the file name of this file (S31). The file retrieval unit 132 then analyzes the obtained file name from left to extract a partial file names at a left end of the obtained file name (S32), while obtaining a content of "/directory" from the file memory unit 15 via the file input/output unit 131 (S33). Then, the file retrieval unit 132 searches the extracted partial file name in the obtained directory (S34) and Judges whether the extracted partial file name exists as a correct file name of a file stored in the file memory unit 15 or not (S35), whether the extracted partial file name is a directory or not (S37), and whether the extracted partial file name is registered as a mount point or not (S39).

In the example of FIGS. 8A to 8C, the file name is given in a format in which several partial file names are connected with a symbol "/" inserted between adjacent partial file names, so that the partial file names "home", "kimura", "Doc", and "Read.Me" are going to be extracted sequentially by means of the step S41 described below. Then, at the steps S34 and S35, whether each partial file name is registered in the obtained directory or not is checked. When a partial file name is not registered in the obtained directory (S35 NO), it implies that the corresponding file does not exist in the file memory unit 15, so that an access failure notice is issued (S36), and the operation is terminated.

On the other hand, when a partial file name is registered in the obtained directory (S35 YES), whether this partial file name is a directory or not is checked at the step S37. If this partial file name is not a directory (S37 NO) but a partial file name at a right end of the given file name (S38 YES), it implies that it has reached to the target file, so that the file management data of the file specified by this partial file name is obtained from the file memory unit 15 via the file input/output unit 131 (S43). Then, the access request processing unit 121 checks the access right by comparing the user ID in the obtained file management data and the user ID of the process which issued the access request, to judge whether it is a proper access or not (S56), and if not (S56 NO), an improper access notice is issued (S57), whereas otherwise (S56 YES), an access preparation with respect to a read request which is expected to be issued subsequently (such as an initial setting of the file position data as a subsequent reading or writing position data, etc.) is carried out (S58) while the file descriptor is returned (S59).

If this partial file name is neither a directory (S37 NO) nor a partial file name at a right end of the given file name (S38 NO), it implies that the corresponding file does not exist in the file memory unit 15, so that an access failure notice is issued (S36), and the operation is terminated.

When the extracted partial file name is a directory (S37 YES), whether this partial file name is registered as a mount point or not is checked at the step S39. If the extracted partial file name is not registered as a mount point (S39 NO), a content of the directory specified by this partial file name is obtained from the file memory unit 15 via the file input/output unit 131 (S40), and a next partial file name at a left end of unanalyzed part of the given file name is extracted (S41) and then the operation from the step S34 on is repeated for this next partial file name.

When a directory specified by the extracted partial file name is registered as a mount point (S39 YES), this is a junction with the different file system, and it implies that the subsequent access is to be shifted to an access to the mounted file system of the portable personal data device 11. In this example, when the file access unit 13 analyzes the file name up to "/home/kimura/", it can be seen that this is the mount point and the file system of the portable personal data device 11 is mounted there.

Consequently, the file retrieval unit 132 issues an access request for a directory which is the mounting target point to the portable personal data device 11 via the file access request transmission unit 143 (S42). Here, the mounting target point is registered in the mount point memory unit 133 on the stationary computer 10, so that the access request for a directory "/PFS" which is the mounting target point is issued by looking up the mount point memory unit 133.

Then, the processing at the portable personal data device 11 side is carried out according to the flow chart of FIG. 10 (S44), to obtain a content of the directory which is the mounting target point.

After this processing at the portable personal data device 11 side at the step S44, the file retrieval unit 132 obtains the content of the directory which is the mounting target point from the portable personal data device 11 via the file transmission and reception unit 141 and the file input/output unit 131 (S45). Then, a next partial file name at a left end of unanalyzed part of the given file name is extracted (S46) and the file retrieval unit 132 searches the extracted partial file name in the obtained directory (S47) and judges whether the extracted partial file name exists as a correct file name of a file stored in the file memory unit 18 or not (S48), and whether the extracted partial file name is a directory or not (S50).

When the extracted partial file name is not registered in the obtained directory (S48 NO), it implies that the the corresponding file does not exist in the file memory unit 18, so that an access failure notice is issued (S49), and the operation is terminated.

On the other hand, when the extracted partial file name is registered in the obtained directory (S48 YES), whether this partial file name is a directory or not is checked at the step S50. If this partial file name is not a directory (S37 NO) but a partial file name at a right end of the given file name (S52 YES), it implies that it has reached to the target file, so that the access request processing unit 121 issues an access request for the file management data of the file specified by this partial file name to the portable personal data device 11 via the file access request transmission unit 143 (S53).

Then, the processing at the portable personal data device 11 side is carried out according to the flow chart of FIG. 10 (S54) again to obtain the file management data of the file specified by this partial file name.

After this processing at the portable personal data device 11 side at the step S54, the file retrieval unit 132 obtains the file management data of the file specified by this partial file name from the portable personal data device 11 via the file transmission and reception unit 141 and the file input/output unit 131 (S55). Then, the file retrieval unit 132 checks the access right by comparing the user ID in the obtained file management data and the user ID of the process which issued the access request, to judge whether it is a proper access or not (S56), and if not (S56 NO), an improper access notice is issued (S57), whereas otherwise (S56 YES), an access preparation with respect to a read request which is expected to be issued subsequently (such as an initial setting of the file position data as a subsequent reading or writing position data, etc.) is carried out (S58) while the file descriptor is returned (S59).

If this partial file name is neither a directory (S50 NO) nor a partial file name at a right end of the given file name (S52 NO), it implies that the the corresponding file does not exist in the file memory unit 18, so that an access failure notice is issued at the step S36, and the operation is terminated.

When the extracted partial file name is a directory (S50 YES), an access request for a directory specified by the partial file name is issued to the portable personal data device 11 via the file access request transmission unit 143 (S51). Then, the processing at the portable personal data device 11 side is carried out according to the flow chart of FIG. 10 (S44) again and the operation from the step S45 on is repeated.

The processing at the portable personal data device 11 side is carried out at the steps S44 and S54 according to the flow chart of FIG. 10 as follows.

Initially, the target computer ID is received at the target computer ID reception unit 162 (S61), and a valid user ID is obtained from the target by target user ID correspondence table memory unit 172 (S62).

Thereafter, the file access request from the file access request transmission unit 143 of the stationary computer 10 is received at the file access request reception unit 163 (S63), and the received access request is interpreted at the file retrieval unit 173 (S64) to determine what this received request is (S65). Here, similarly as the file retrieval unit 132 of the stationary computer 10, the file retrieval unit 173 analyzes the file name specified by the access request from left to extract a partial file names at a left end of the specified file name, and checks whether the extracted partial file name is a correct file name of a file stored in the file memory unit 18 or not and whether a file with the extracted partial file name exists in the file memory unit 18 or not.

In the example shown in FIGS. 8A to 8C, there exists a file called "/PFS/Doc/Read.Me" in the file system of the portable personal data device 11, so that the file retrieval unit 173 of the portable personal data device 11 transmits the position data of this file to the access request processing unit 121 of the stationary computer 10.

When the received access request is judged as the access request for the file management data at the step S65 which is the open request, the file retrieval unit 173 of the portable personal data device 11 reads out the file management data for this file from a specified position in the file management data memory unit 182 (S70), and the file management data conversion unit 171 of the portable personal data device 11 converts the read out file management data into a form suitable for the stationary computer 10 by inserting the user ID obtained from the target by target user ID correspondence memory unit 172, and transmits the converted file management data to the stationary computer 10 via the file transmission and reception units 161 and 141 (S71). and then the operation returns to the step S63. The converted file management data transmitted at this step S71 are received by the stationary computer 10 at the step S55 described above.

After the access request which is the open request is admitted, the application execution unit 12 of the stationary computer 10 issues the file access request along with the file descriptor, to carry out the reading or writing of the file data. Here, the access request is either the file reading request or the file writing request.

When the received access request is judged as the access request for file reading, the appropriate data of the requested file are read out from a specified position in the file data memory unit 181 (S68), and the obtained file content is returned to the application execution unit 12 of the stationary computer 10 via the file transmission and reception units 161 and 141 (S69), and then the operation returns to the step S63. When the access request specifies a directory instead of a file, the content of a directory read out and transmitted at these steps S68 and S69 are received by the stationary computer 10 at the step S45 described above.

When the received access request is judged as the access request for file writing, a preparation for data writing into a specified position in the file data memory unit 181 is carried out (S66), and the writing data received via the file transmission and reception units 141 and 161 are written into the file data memory unit 181 (S67).

As described, according to this first embodiment, the files necessary for the user are collectively stored in the file memory unit 18 of the portable personal data device 11 carried along by the user, and in a case of working on these files at a working site, visiting spot, or home, by utilizing the stationary computer 10 available there, the stationary computer 10 issues the file access request to the portable personal data device 11, and the portable personal data device 11 in response converts the file management data for the requested file into a form suitable for this stationary computer 10 and returns the converted file management data to this stationary computer 10, such that the user can share his own files among various environments, without requiring the user to be conscious of a type of the stationary computer 10 and its computer environment that are going to be utilized, and without demanding the user to spend considerable efforts in copying data and maintaining a consistency among the copied data.

At a time of converting the file management data, there are cases in which it is effective to carry out the conversion of the data structure of the file management data as well, in order to avoid the erroneous interpretation of the file management data at the stationary computer 10 side which presumes a particular data structure for the file management data that may not necessarily be the same as the data structure used at the portable personal data device 11 side.

Moreover, the target by target user ID correspondence table memory unit 172 of the portable personal data device 11 stores a correspondence between the computer ID of each stationary computer and data necessary in converting the file management data into a form suitable for this stationary computer, so that the conversion of the file management data into a form suitable for each stationary computer can be realized easily.

Furthermore, as the file system of the portable personal data device 11 is mounted to the stationary computer 10 at the different mount points for different users (owners of the portable personal data device 11), so that a more sophisticated service concerning the files can be provided at the stationary computer 10.

Figure 11:
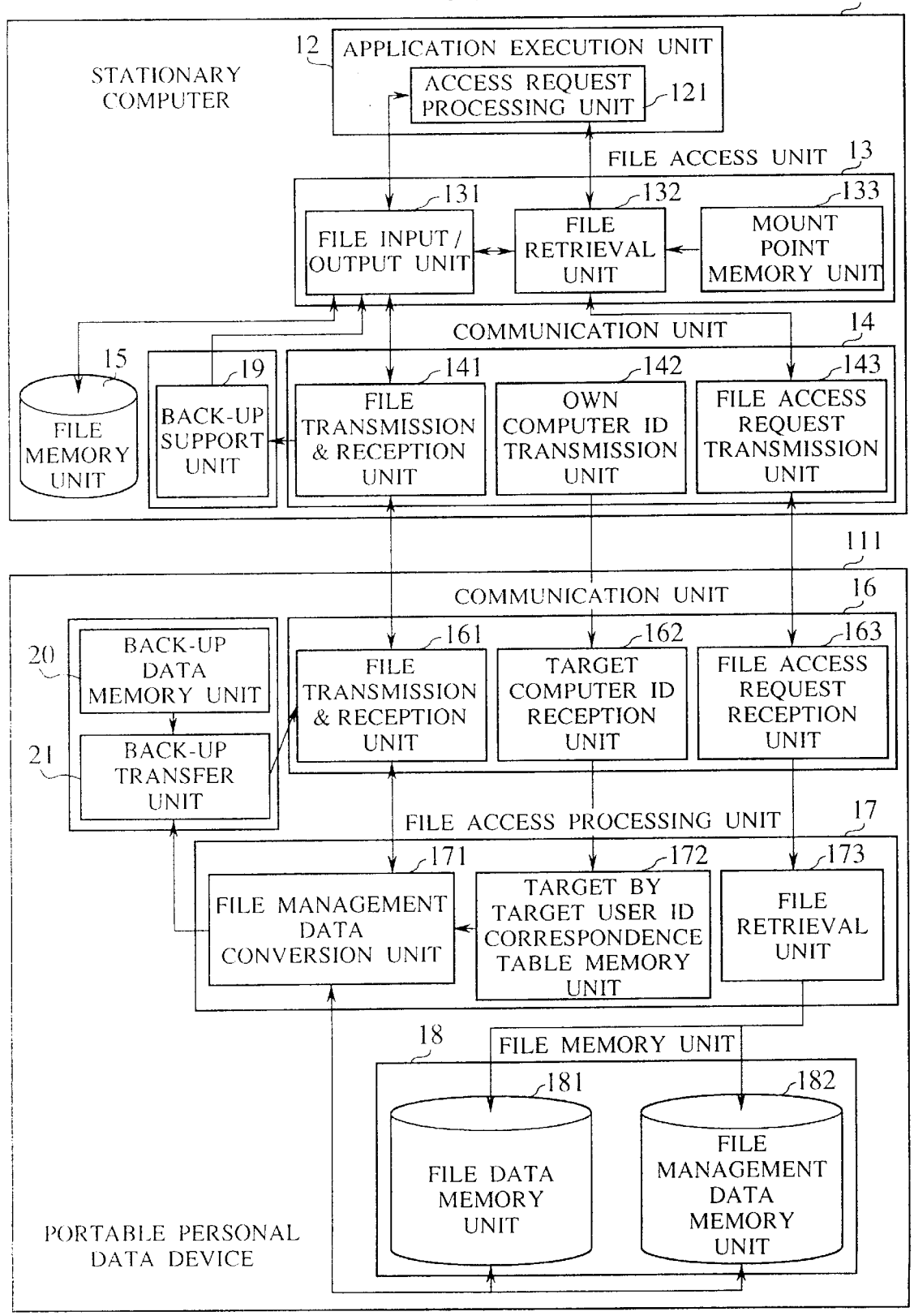
FIG. 11 is a detailed block diagram of a second and a third embodiment of a portable file system according to the present invention.
Figure 13:
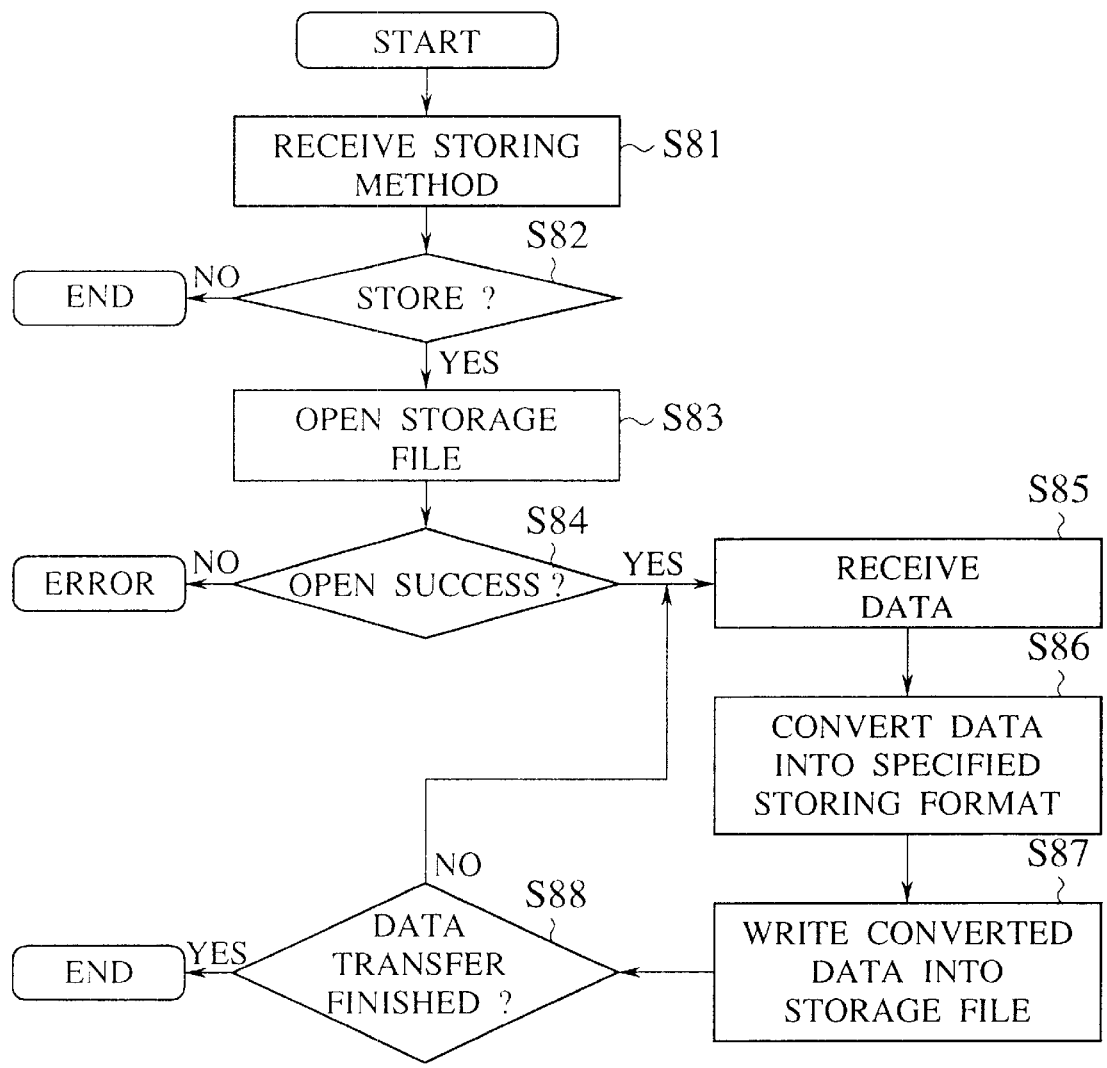
FIG. 13 is a flow chart for an operation of a back-up support unit of a stationary computer in the portable file system of FIG. 11.

Referring now to FIG. 11 to FIG. 13, a second specific embodiment of a portable file system according to the present invention will be described in detail.

This second embodiment is a modification of the first embodiment described above, which incorporates an additional feature concerning a production of back-up for the file system of the portable personal data device in the stationary computer side, when the file system of the portable personal data device is mounted to the file system of the stationary computer.

In this second embodiment, the portable file system has a configuration as shown in FIG. 11, which differs from the first embodiment of FIG. 3 in that the portable personal data device 111 further includes a back-up datamemory unit 20, and a back-up transfer unit 21 connected with the file transmission and reception unit 161 and the file management data conversion unit 171, while the stationary computer 101 further includes a back-up support unit 19 connected with the file input/output unit 131 and the file transmission and reception unit 141. The rest of this configuration of FIG. 11 is substantially the same as in FIG. 3 described above.

The back-up data memory unit 20 in the portable personal data device 111 registers an appropriate back-up storing method (storing location, storing format, protection data) for each one of a plurality of stationary computers registered as the connection target, in a table form shown in FIG. 12. In an exemplary content of this back-up data memory unit 20 shown in FIG. 12, an indication of a directory for storing the back-up data (storing location entry), a protection data specifying access permission information for the back-up data such as read permitted "R/O" and read and write not permitted "No R/W", and a storing format of the back-up data such as "tar format" and "tar+compress format" are registered for each one of three stationary computers Work Station-A, Work Station-B, and Personal Computer-D that are registered as the connection target of the portable personal data device 111. In this example of FIG. 12, the Personal Computer-D has a setting for not making the back-up.

When the portable personal data device 111 enters into a state capable of communicating with the stationary computer 101, the portable personal data device 111 and the stationary computer 101 recognize each other as the communication target, and the back-up storing method corresponding to this stationary computer 101 to which this portable personal data device 111 has been connected is obtained from the back-up data memory unit 20.

After the mounting operation for mounting the file system of the portable personal data device 111 to the file system of the stationary computer 101 is completed, the usual data exchange operations such as those for the file access request and the corresponding response are carried out between the portable personal data device 111 and the stationary computer 101, but these data exchange operations do not necessarily occupy the communication path between the portable personal data device 111 and the stationary computer 101 exclusively. For this reason, by utilizing the idle time of the communication path, the data communication for the back-up is made by using a lower priority level than the usual data exchanges.

This data communication for the back-up is realized by transmitting the back-up storing method (storing location, storing format, protection data) from the back-up transfer unit 21 of the portable personal data device 111 through the file transmission and reception unit 161 to the stationary computer 101 side first, and then transferring all of the file data stored in the file data memory unit 181 and the file management data stored in the file management data memory unit 182 for the file system of the portable personal data device 111 to the stationary computer 101 side. At a time of this data transfer, the file management data stored in the file management data memory unit 182 are converted by the file management data conversion unit 171 according to the target by target user ID correspondence table memory unit 172 just as described above for the first embodiment, and the converted file management data are transferred to the stationary computer 101 side as the back-up data.

The back-up support unit 19 of the stationary computer 101 receives a command data concerning the back-up storing method from the portable personal data device 111 through the file transmission and reception unit 141, and carries out the operation to store the subsequently transferred back-up data through the file input/output unit 131 according to the received command data.

More specifically, this back-up support unit 19 of the stationary computer 101 operates according to the flow chart of FIG. 13 as follows.

Namely, when the stationary computer 101 is connected with the portable personal data device 111, the back-up support unit 19 receives the command data for the back-up storing method from the back-up transfer unit 21 of the portable personal data device 111 (S81). Then, according to the received command data, whether or not to store the back-up is determined (S82). In a case of not making the back-up (S82 NO), the operation is terminated. Otherwise (S82 YES), the back-up support unit 19 opens a storage file for storing the back-up data at the storing location (directory) in the file memory unit 15 which is specified in the received command data for the back-up storing method (S83). In a case this opening of the storage file has failed (S84 NO), the back-up cannot be made properly, so that the error is reported and the operation is terminated. In a case of the open success (S84 YES), the back-up data are sequentially received from the file transmission and reception unit 161 of the portable personal data device 111 (S85), and the received data are converted into the storing format (data format) specified in the received command data for the back-up storing method (S86), and the writing of the converted data into the storage file is carried out (S87). The operation of the steps S85 to S87 are then repeated until all the data transfer for the back-up is finished (S88 YES).

Now, there are cases in which the files (of the file data memory unit 181 and the file management data memory unit 182) in the portable personal data device 111 are updated after the back-up is completed, or the data for which the back-up has already been made are updated during a course of the back-up operation. For this reason, in a case of the update of the data (file) for which the back-up has already been made, the updated data are also transmitted to the back-up support unit 19 through the back-up transfer unit 21 and the file transmission and reception units 161 and 141 just as described above, such that the back-up data in the stationary computer 101 side are also updated accordingly.

It is to be noted that the back-up data memory unit 20 for registering the back-up storing method specifying a location in the file system of the stationary computer 101 at which the back-up of the file system of the portable personal data device 111 are to be stored may be provided on the stationary computer 101 side, rather than the portable personal data device 111 side as described above.

According to this second embodiment, the back-up of the files stored in the portable personal data device 111 are produced automatically in the stationary computer 101 side, and the file content are updated to the latest one at the stationary computer 101 side as well, so that the loss of the valuable data of each user due to the loss or damaging of the portable personal data device 111 can be prevented effectively.

Next, a third specific embodiment of a portable file system according to the present invention will be described in detail.

This third embodiment is a modification of the second embodiment described above, which incorporates an additional feature concerning a mechanism for utilizing the back-up data on the stationary computer 101 side as a substitute for the file system of the portable personal data device 111 when the portable personal data device 111 is disconnected from the stationary computer 101.

In this third embodiment, the portable file system has a configuration substantially similar as in the second embodiment of FIG. 11 described above.

Now, the owner of the portable personal data device 111 is accessible to the data stored in the portable personal data device 111 whenever necessary, either by connecting the portable personal data device 111 to the stationary computer 101 available at hand or utilizing the input and output device such as a display provided on the portable personal data device 111 itself. However, with this much of accessibility, the other users who have proper access rights for making accesses to the data stored in the portable personal data device 111 are actually accessible to these data only when this portable personal data device 111 is connected to some stationary computer 101 accessible for these other users, and this rather severe limitation on the utilizabililty of the data for the other users may impair the convenience of the portable file system as a whole considerably.

For this reason, in this third embodiment, when the portable personal data device 111 is disconnected from the stationary computer 101, the back-up data stored in the stationary computer 101 are utilized as a substitute for the file system of the portable personal data device 111, such that the other users who have proper access rights can be accessible to these data whenever necessary. In addition, it becomes possible for the program executed on the stationary computer 101 to make an access to the files of the portable personal data device 111, without a tedious task of checking whether the portable personal data device 111 is connected to the stationary computer 101 or not every time an access is to be made.

Here, an exemplary case in which a different mount point is registered for each user in the mount point memory unit 133 of the stationary computer 101 will be described in further detail.

In this case, when the portable personal data device 111 is disconnected from the stationary computer 101, the back-up support unit 19 of the stationary computer 101 sets up a symbolic link from the mount point at which the file system of the portable personal data device 111 had been mounted to the storing location of the back-up data. In this case, the back-up data stored in the stationary computer 101 should not be stored in the compressed or archive format, but should be stored in a format by which the structure of the file system of the portable personal data device 111 can be reproduced directly on the stationary computer 101.

Here, however, the primary purpose of the back-up data still lies in the prevention of the data loss due to a trouble in the portable personal data device 111 or the file system stored therein, and the service for the file accesses by the other users is only of secondary importance, so that it is usually preferable to protect the back-up data by permitting only the reading of the back-up data by the other users and not permitting the updating or the changing of the back-up data by the other users.

Note that, in a case the file data of the portable personal data device 111 are lost, the back-up data stored in the stationary computer 101 are copied to the file memory data 18 of the portable personal data device 111, but the file management data are converted at a time of making the back-up, so that there is a need to re-convert these converted file management data to restore the original form. This re-conversion can be realized by restoring the unique user ID of the portable personal data device 111 in place of the user ID in the back-up data, or by changing the user ID in the back-up data into a blank entry.

Figure 14:
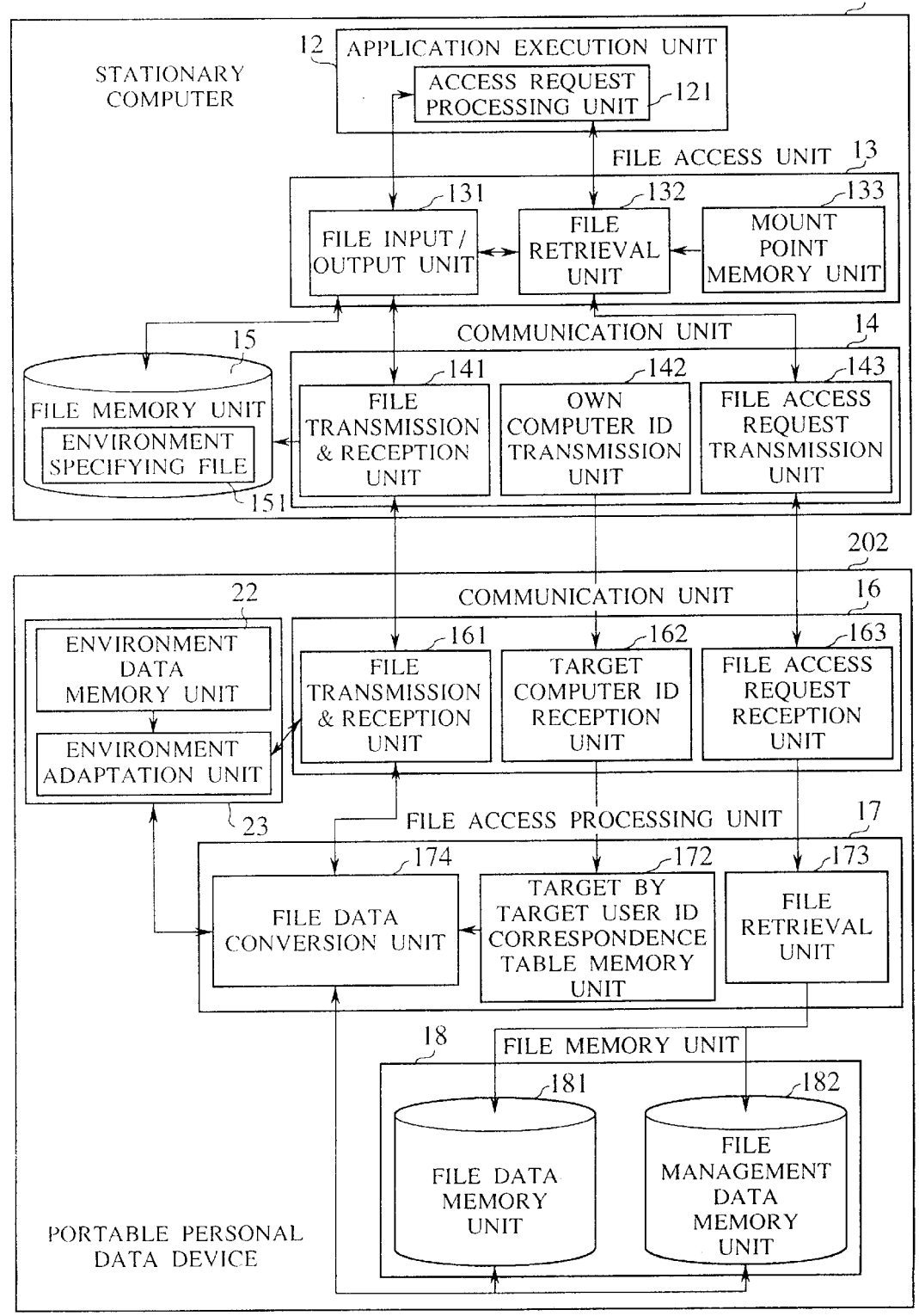
FIG. 14 is a detailed block diagram of a fourth embodiment of a portable file system according to the present invention.

Referring now to FIG. 14, a fourth specific embodiment of a portable file system according to the present invention will be described in detail.

This fourth embodiment is a modification of the first embodiment described above, which incorporates an additional feature concerning a use of an environment specifying file for storing data indicative of a structure of a computer environment in the stationary computer.

In this fourth embodiment, the portable file system has a configuration as shown in FIG. 14, which differs from the first embodiment of FIG. 3 in that the file management data conversion unit 171 in FIG. 3 is replaced by a file data conversion unit 174 in the portable personal data device 202, and the portable personal data device 202 further includes an environment data memory unit 22 and an environment adaptation unit 23 connected with the file transmission and reception unit 161 and the file data conversion unit 174, while the stationary computer 201 further includes an environment specifying file 151 located at a specific location in the file memory unit 15. The rest of this configuration of FIG. 14 is substantially the same as in FIG. 3 described above.

Now, the portable personal data device of the present invention can be connected with various different types of stationary computers. Consequently, the portable personal data device is required to be equipped with a function for flexibly dealing with difference in hardware (such as processor type, memory capacity, peripheral devices), difference in OS, and difference in environmental setting. In this fourth embodiment, this function is realized by means of the environment specifying file 151 provided at a specific location in the stationary computer 201, and the environment adaptation unit 23 provided on the portable personal data device 202.

When the portable personal data device 202 enters into a state capable of communicating with the stationary computer 201, after the file system of the portable personal data device 202 is mounted to the file system of the stationary computer 201, the environment adaptation unit 23 on the portable personal data device 202 looks up the environment specifying file 151 located at a specific location in the file system of the stationary computer 201 through the communication unit 16, and obtains the data indicative of the structure of the computer environment of this currently connected stationary computer 201 from this environment specifying file 151.

Then, the environment adaptation unit 23 selects one environment data corresponding to this currently connected stationary computer 201 among various environment data provided in the environment data memory unit 22 in advance, according to the data obtained from the environment specifying file 151 of the currently connected stationary computer 201. Then, the file data conversion unit 174 converts the file data containing the descriptions concerning hardware, OS, and environment setting among the file data stored in the file data memory unit 181, and these converted file data are transmitted to the currently connected stationary computer 201 side through the file transmission and reception unit 161, According to this fourth embodiment, the user of the portable personal data device 202 can utilize the stationary computer 201 without setting up the parameters of the computer environment according to his own preference every time the stationary computer 201 is to be utilized, as the file data of the portable personal data device 202 are automatically converted in a form suitable for the computer environment of the currently connected stationary computer 201.

Figure 15:
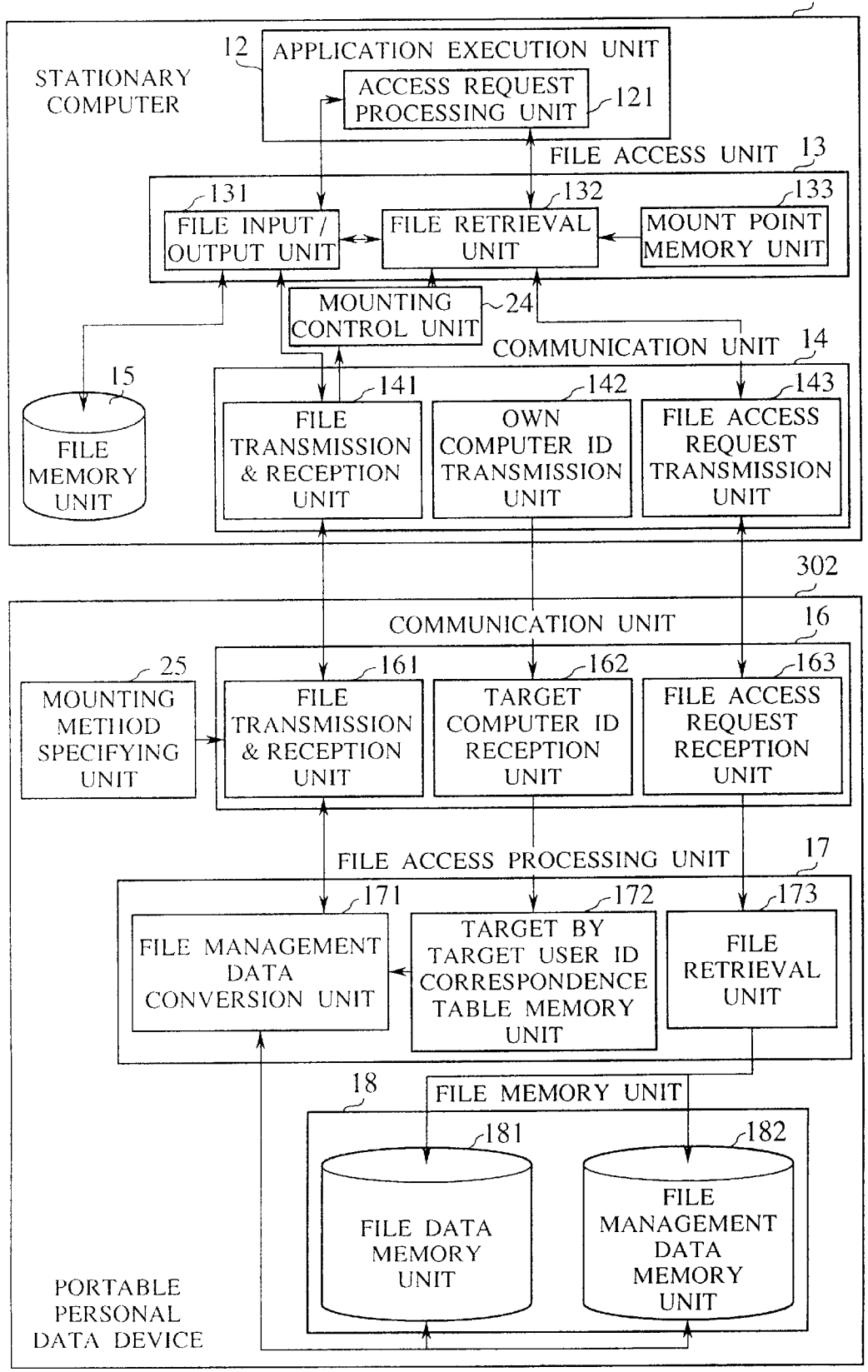
FIG. 15 is a detailed block diagram of a fifth embodiment of a portable file system according to the present invention.

Referring now to FIG. 15, a fifth specific embodiment of a portable file system according to the present invention will be described in detail.

This fifth embodiment is a modification of the first embodiment described above, which incorporates an additional feature concerning a control of a disclosure of the file system of the portable personal data device mounted on one stationary computer with respect to the other stationary computers connected with that one stationary computer. Namely, in this fifth embodiment, when a certain stationary computer-A is connected with a plurality of other stationary computers through a LAN (Local Area Network) while the file system of the portable personal data device is mounted on that stationary computer-A, whether this stationary computer-A can disclose the mounted file system of the portable personal data device to the other stationary computers or not is controlled by the portable personal data device.

In this fifth embodiment, the portable file system has a configuration as shown in FIG. 15, which differs from the first embodiment of FIG. 3 in that the portable personal data device 302 further includes a mounting method specifying unit 25 connected with the file transmission and reception unit 161, while the stationary computer 301 further includes a mounting control unit 24 connected between the file transmission and reception unit 141 and the file retrieval unit 132. The rest of this configuration of FIG. 15 is substantially the same as in FIG. 3 described above.

The mounting method specifying unit 25 issues a command specifying whether the stationary computer 301 can disclose the file system of the portable personal data device 302 mounted on the stationary computer 301 to the other stationary computers or not, and the mounting control unit 24 controls the mounting operation according to the command received from the mounting method specifying unit 25.

Here, the command issued by the mounting method specifying unit 25 stores mounting method data indicating an appropriate mounting method to be used at each stationary computer, for all the stationary computers registered as the connection target of this portable personal data device 302, and issues the command including one of the mounting method data corresponding to the currently connected stationary computer 301, such that whether this stationary computer 301 can disclose the file system of the portable personal data device 302 mounted on this stationary computer 301 to the other stationary computers or not can be specified by the mounting method data included in the command issued from the mounting method specifying unit 25.

A control of the mounting method has already been realized by means of a command called "exportfs" in the conventional distributed file system called NFS which is utilized in the UNIX for example, and such a known procedure for controlling the mounting method can be carried out at the mounting control unit 24. The mounting method specifying unit 24 is provided on the portable personal data device 302 in order to control such an operation of the mounting control unit 24 on the stationary computer 301 from the portable personal data device 302 side.

Referring now to FIG. 16 and FIG. 17, a sixth specific embodiment of a portable file system according to the present invention will be described in detail.

This sixth embodiment is a modification of the second embodiment described above, which incorporates an additional feature concerning a mechanism for controlling a manner of making back-up at each stationary computer from the portable personal data device side.

In this sixth embodiment, the portable file system has a configuration as shown in FIG. 16, which differs from the second embodiment of FIG. 11 in that the back-up data memory unit 20 in the portable personal data device 402 further includes a back-up control data memory unit 211. The rest of this configuration of FIG. 16 is substantially the same as in FIG. 11 described above.

Now, in general, the data stored inside the portable personal data device may contain highly secret data or highly private data concerning the privacy of the user. On the other hand, a provision to make the back-up for the file system of the portable personal data device in each one of many stationary computers to which the portable personal data device is connected at various occasions may cause a significant waste of the memory regions in the memory device on each stationary computer side. For these reasons, it is important for the portable personal data device to be able to control a manner of making the back-up at each stationary computer, such that whether the back-up should be made at the currently connected stationary computer can be specified, and the back-up for only a limited region within the file system of the portable personal device can be made. This sixth embodiment is directed to such a back-up control mechanism.

To this end, the back-up data memory unit 21 of the portable personal data device 402 includes the back-up control data memory unit 211 which stores the back-up control data as shown in FIG. 17, which include data (back-up entry) for specifying whether or not to make the back-up at each connection target stationary computer 401, and data (region entry) for specifying a region in the file system of the portable personal data device 402 for which the back-up should be made at the currently connected stationary computer 401, for each connection target stationary computer of the portable personal data device 402.

The back-up transfer unit 21 of the portable personal data device 402 obtains the back-up control data for the currently connected stationary computer 401 from the back-up control data memory unit 211, before activating the back-up operation, and judges whether or not to make the back-up in this currently connected stationary computer 401 according to the obtained back-up control data. In a case of not making the back-up, this fact is notified to the back-up support unit 19 of the stationary computer 401, and the processing related to the back-up is terminated. On the other hard, in a case of making the back-up, the back-up transfer unit 21 reads out a region for which the back-up is permitted (region entry) from the obtained back-up data, selectively reads out the data belonging to the permitted region from the file memory unit 18, and transfer the read out data as the back-up data to the stationary computer 401.

According to this sixth embodiment, it is possible to prevent a wasteful production of unnecessarily many copies of the file system of the portable personal data device as the back-up, by limiting the connection target stationary computers at which the back-up is to be made. In addition, it is also possible to prevent an occurrence of an inadvertent leak of highly secret or private data stemming from the back-up of the file system of the portable personal data device in the stationary computer, by limiting a region in the file system of the portable personal data device for which the back-up is to be made.

Figure 18:
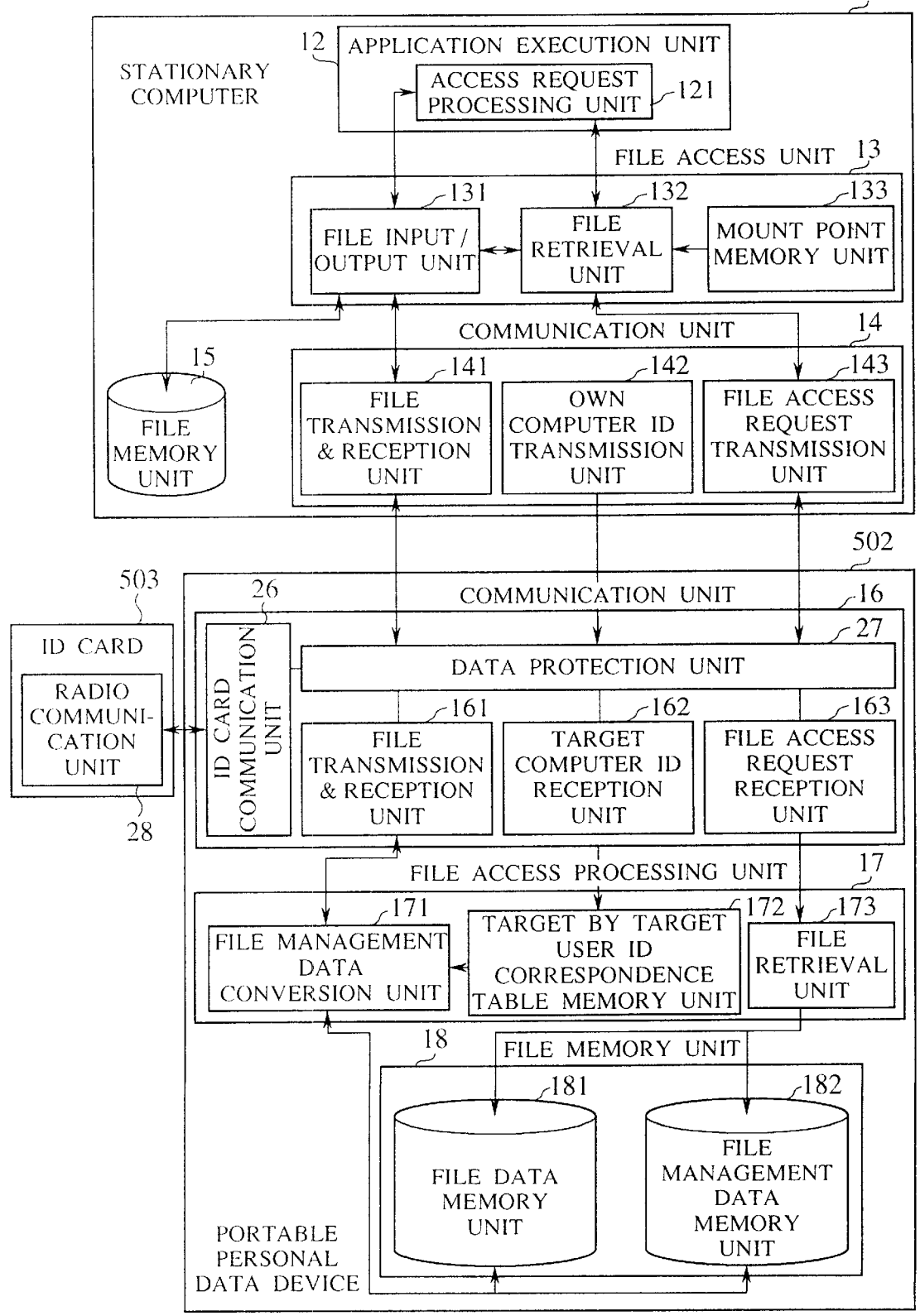
FIG. 18 is a detailed block diagram of a seventh embodiment of a portable file system according to the present invention.

Referring now to FIG. 18, a seventh specific embodiment of a portable file system according to the present invention will be described in detail.

This seventh embodiment is a modification of the first embodiment described above, which incorporates an additional feature concerning a security mechanism using an ID card.

In this seventh embodiment, the portable file system has a configuration as shown in FIG. 18, which differs from the first embodiment of FIG. 3 in that the communication unit 16 of the portable personal data device 502 further includes an ID card communication unit 26 and a data protection unit 27, and there is provided an ID card 503 having a radio communication unit 28 which is issued to a proper owner of the portable personal data device 502 alone in advance. The rest of this configuration of FIG. 18 is substantially the same as in FIG. 3 described above.

Now, in general, the data stored inside the portable personal data device may contain highly secret data or highly private data concerning the privacy of the user as already mentioned above. On the other hand, when a memory capacity of the portable personal data device is increased in conjunction with a steady advance of the semiconductor device technology, the usefulness of the portable personal data device can be increased, but at the same time a damage due to the data leak caused by a loss or a theft of the portable personal data device is also increased. For this reason, it is important for the portable personal data device to be equipped with a security mechanism to resolve this problem without sacrificing the convenience of the portable personal data device. This seventh embodiment is directed to such a security mechanism.

To this end, the proper owner of the portable personal data device 502 carries the ID card 503 which communicates with the portable personal data device 502 through the radio communication unit 28 and the ID card communication unit 26, only when this ID card 503 is in a sufficient proximity to the portable personal data device 502. Then, the file system of this portable personal data device 502 is allowed to be disclosed to the stationary computer 501 side or displayed at a data display device (not shown) provided on this portable personal data device 502 only when this portable personal data device 502 is in communication with the ID card 503 carried by the proper owner of this portable personal data device 502, so as to realize the user authentication function by means of the ID card 503.

Here, the radio communication unit 28 of the ID card 503 constantly transmits ID data for identifying the owner of this portable personal data device 502 who carries this ID card 503, and the communicates with the portable personal data device 502 at a constant time interval (t msec for example, where t is a real number in general) in order to confirm their proximity.

The data protection unit 27 of the portable personal data device 502 is constantly notified by the ID card communication unit 28 as to whether the communication with the ID card 503 is successfully established or not. Then, only when the successful establishment of the communication between the ID card 503 and the ID card communication unit 26 is confirmed, for a predetermined subsequent time interval (t msec), the data protection unit 27 transfers the data access request from the stationary computer 501 to the file access processing unit 17 and the response from the file access processing unit 17 to the stationary computer 501, or displays the data on the data display device provided on this portable personal data device 502 according to a data display request entered from an input device (not shown) provided on this portable personal data device 502.

In this seventh embodiment, the proper owner of the portable personal data device 502 always carries the ID card 503 along with him. For instance, the ID card 503 can be given in a form a badge to be worn by the proper owner. Consequently, the communication at the constant time interval between the portable personal data device 502 and the ID card 503 can be successfully established as long as the proper owner is present nearby the portable personal data device 502. Therefore, the proper owner of this portable personal data device 502 can freely utilize this portable personal data device 502, to carry out desired operations such as an access to the data stored in this portable personal data device 502 from the stationary computer 501, a display of the data stored in this portable personal data device 502 on the data display device provided on this portable personal data device 502, etc.

On the other hand, whenever the proper owner moves away from the portable personal data device 502, the communication at the constant time interval between the portable personal data device 502 and the ID card 503 cannot be maintained. When the failure of this communication is detected at the data protection unit 27, the data protection unit 27 prohibits the transfer of the data access request from the stationary computer 501 or the data display request from the input device of this portable personal data device 502 to the file access processing unit 17, so as to prevent the leak of the data stored in this portable personal data device 502.

In this manner, according to this seventh embodiment, it is possible to prevent the improper use of the portable personal data device 502 by a person who is not a proper owner of the portable personal data device 502 as well as the leak of the data stored in the portable personal data device 502 to a person who is not a proper owner of the portable personal data device 502.

Figure 19:
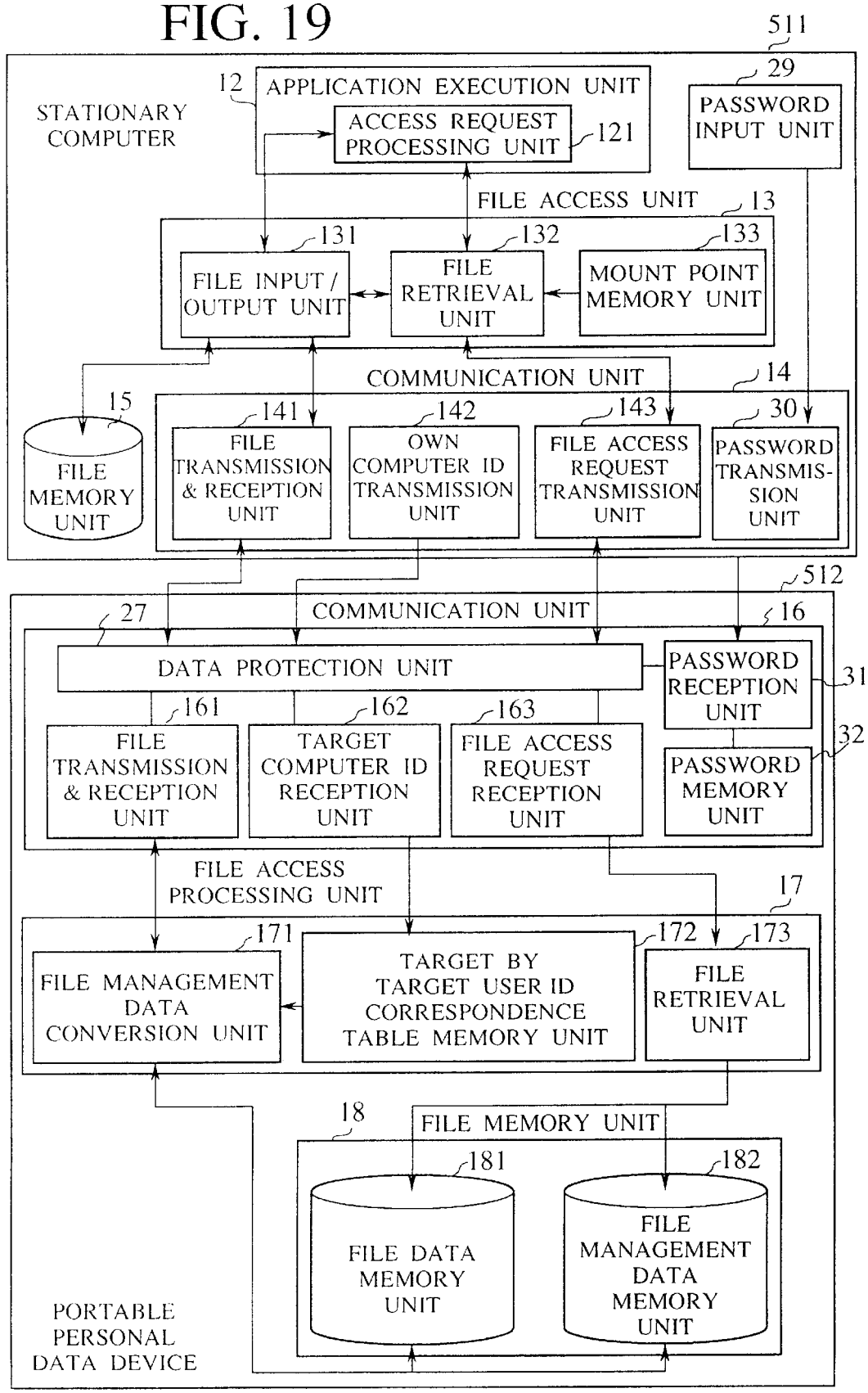
FIG. 19 is a detailed block diagram of an eighth embodiment of a portable file system according to the present invention.

Referring now to FIG. 19, an eighth specific embodiment of a portable file system according to the present invention will be described in detail.

This eighth embodiment is a modification of the first embodiment described above, which incorporates an additional feature concerning a security mechanism using a password. This security mechanism is functionally similar to that of the seventh embodiment described above, but simpler as it requires no ID card.

In this eighth embodiment, the portable file system has a configuration as shown in FIG. 19, which differs from the seventh embodiment of FIG. 18 in that the ID card communication unit 26 is omitted in the communication unit 16 of the portable personal data device and the ID card 503 is not provided, while the stationary computer 511 further includes a password input unit 29 and a password transmission unit 30 provided in the communication unit 14, and the communication unit 16 of the portable personal data device 512 further includes a password reception unit 31 and a password memory unit 32. The rest of this configuration of FIG. 19 is substatially the same as in FIG. 18 described above.

With this configuration, after a communication between the portable personal data device 511 and the stationary computer 512 is established, before the file system of the portable personal data device 512 is mounted to the stationary computer 511, the user enters a password to the portable personal data device 512 via the password input unit 29 and the password transmission unit 30 of the stationary computer 511. Here, the password of the proper owner of the portable personal data device 512 is registered in the password memory unit 32 of the portable personal data device 512 in advance for the purpose of the user authentication, and this password is defined separately from a password required to be entered at the stationary computer 511 at a time of starting the use of the stationary computer 511.

Then, before the mounting operation, the data protection unit 27 matches the password entered from the stationary computer 511 and received by the password reception unit 31 with the registered password in the password memory unit 32, and only when they match with each other, the data protection unit 27 accepts the subsequent mount request and data access request from the stationary computer 511 to the file access processing unit 17, whereas when they do not match with each other, the data protection unit 27 rejects the subsequent mount request and data access request from the stationary computer 511.

In this manner, the security mechanism substantially similar to that of the seventh embodiment described above can be realized in this eighth embodiment, without using the ID card.

Referring now to FIG. 20 and FIGS. 21A to 21C, a ninth specific embodiment of a portable file system according to the present invention will be described in detail.

This ninth embodiment is a modification of the first embodiment described above, which uses access permit/reject data as the file management data to be converted, instead of the user ID used in the first embodiment.

Figure 20:
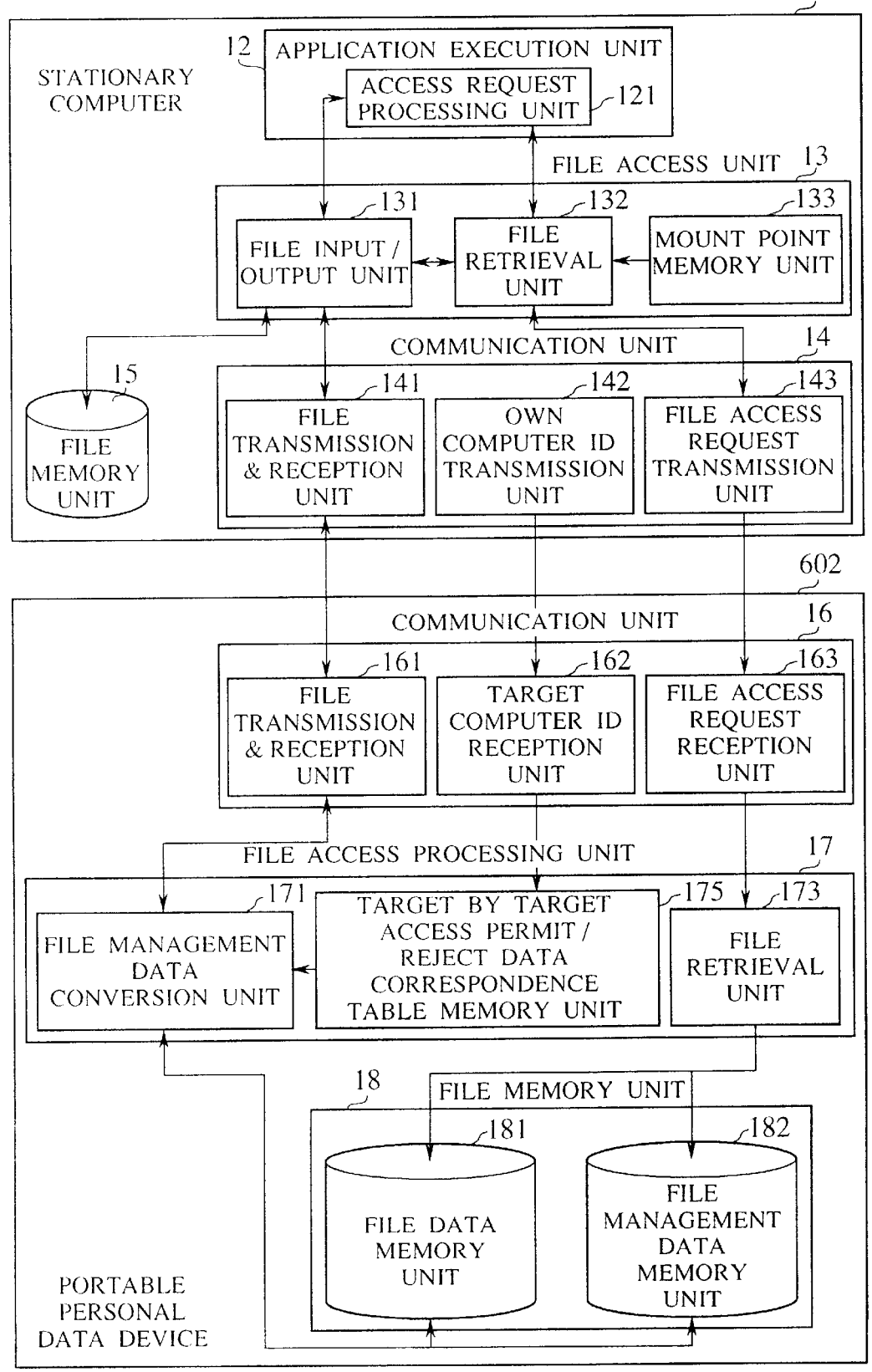
FIG. 20 is a detailed block diagram of a ninth embodiment of a portable file system according to the present invention.

In this ninth embodiment, the portable file system has a configuration as shown in FIG. 20, which differs from the first embodiment of FIG. 3 in that the file access processing unit 17 of the portable personal data device 602 includes a target by target access permit/reject data correspondence table memory unit 175 instead of the target by target user ID correspondence table memory unit 172 of FIG. 3. The rest of this configuration of FIG. 20 is substantially the same as in FIG. 3 described above.

Now, in general, the portable personal data device is expected to be used by being connected with various different types of stationary computer. For this reason, it is necessary to change the access permit/reject data for each execution file containing a machine language for a specific type of stationary computer that is stored in the file memory unit 18 of the portable personal data device, whenever the portable personal data device is connected with a stationary computer of a different type, such that this execution file will not be executed by error at that stationary computer of a different type.

On the other hand, suppose a situation in which a certain user belonging to a certain company has a certain file which is a secret outside the company in his own portable personal data device, and as this certain user uses this certain file by connecting his own portable personal data device to a computer terminal at the company, the access permit/reject data for this certain file is set to permit an access to this certain file for all the other users of the computer terminals at the company. Then, when this certain user wishes to use his owl portable personal data device outside of the company by connecting it to a stationary computer outside the company, there is a need to change the access permit/reject data for this certain file in order to prevent an access to this certain file by the other users of this stationary computer outside the company.

In order to deal with such situations, the portable personal data device of this ninth embodiment is capable of changing the access permit/reject data for files of the portable personal data device depending on the stationary computer to be connected with this portable personal data device.

To this end, the target by target access permit/reject data correspondence table memory unit 175 manages a table of correspondence between each file and the access permit/reject data of each file, for each one of all the registered connection target stationary computers (i.e., a group of computers generally referred as a domain). Here, this correspondence table may not necessarily manage the access permit/reject data for all the files of the file system of the portable personal data device, and it suffices for this correspondence table to manage the access permit/reject data for only those files for which the access permit/reject data are to be changed depending on the stationary computer connected with the portable personal data device.

More specifically, the target by target access permit/reject data correspondence table memory unit 175 stores the exemplary correspondence tables as shown in FIGS. 21A, 21B, and 21C, for Work Station-A, Work Station-B, and Other Machines, respectively. Here, each correspondence table registers the file names ("/PFS/Doc/Read.Me", etc.) of the files for which the access permit/reject data are to be changed depending on the stationary computer connected with the portable personal data device, and the corresponding access permit/reject data ("rw-", "r--", etc.), for each connection target stationary computer ("Work Station-A", etc.). The access permit/reject data here has three parts, including the access permit/reject data for an owner of the files ("Owner" column), the access permit/reject data for a group which owns the files (Group column), and the access permit/reject data for other users ("Other" column), and each access permit/reject data indicates permit or reject of three types of access including read (r), write (w), and execute (x) in this order, where a symbol (-) indicates the reject of an access.

When the access request for the file management data is issued from the file retrieval unit 312 of the currently connected stationary computer 601, the file management data conversion unit 171 checks whether the conversion of the access permit/reject data for the requested file is necessary or not according to the target by target access permit/reject data correspondence table memory unit 175 by using the file name specified by the access request and the target computer ID of the currently connected stationary computer 601. Then, only when it is necessary, the file management data conversion unit 171 converts the access permit/reject data for the requested file according to the correspondence table stored in the target by target access permit/reject data correspondence table memory unit 175, and transfers the converted access permit/reject data to the currently connected stationary computer 601.

When the onverted access permit/reject data is obtained through the file transmission and reception unit 141 and the file input/output unit 131, the file retrieval unit 132 of the currently connected stationary computer 601 judges the permission or rejection of the access request issued by the access request processing unit 121 according to the obtained access permit/reject data, and notifies the rejection in a case the access request is rejected, or carries out the processing according to the requested access type in a case the access request is permitted.

In this manner, according to this ninth embodiment, it is possible to control an access to a file in the file system of the portable personal data device from the stationary computer, under a different access permit/reject condition depending on a type of the currently connected stationary computer.

Figure 22:
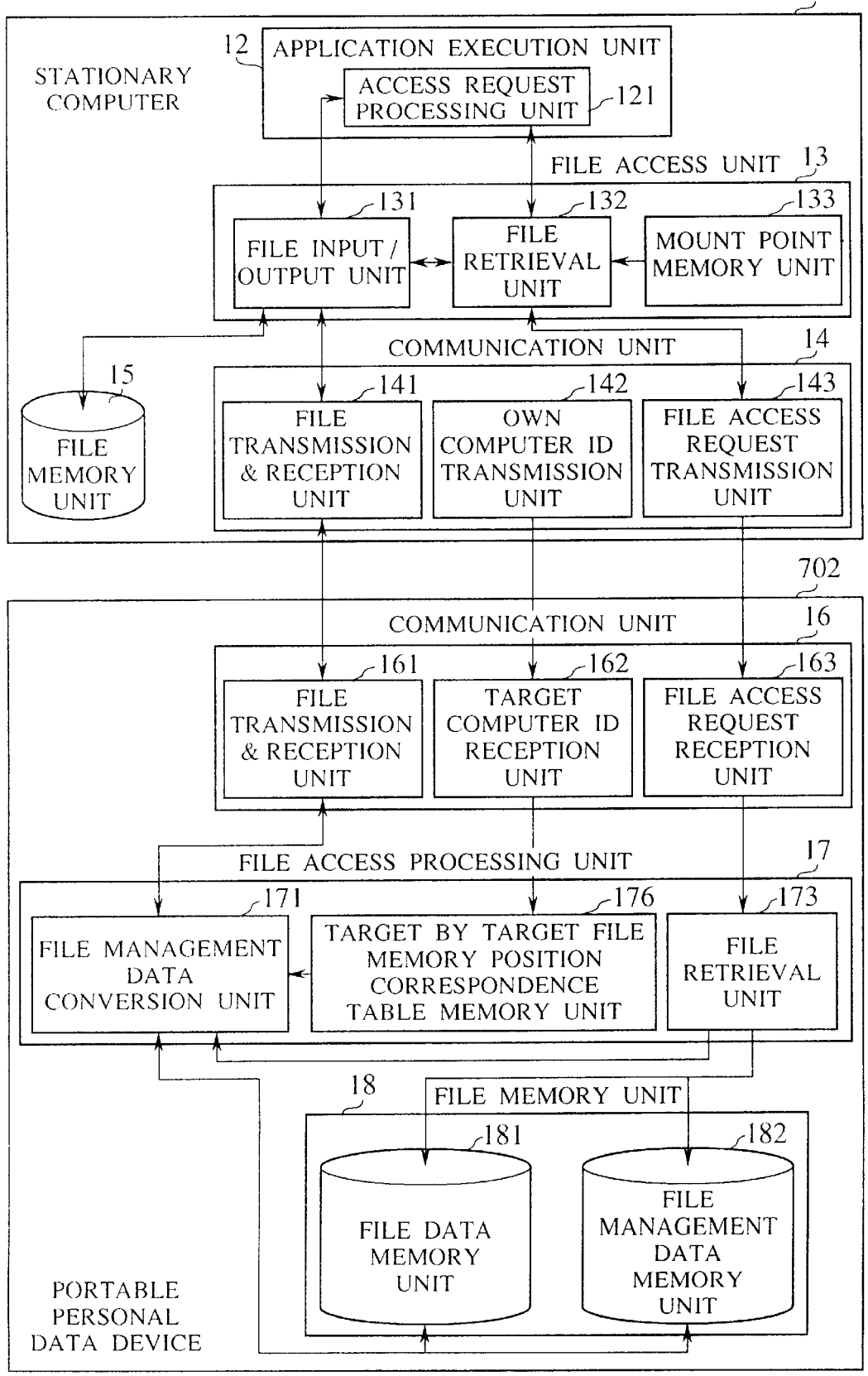
FIG. 22 is a detailed block diagram of a tenth embodiment of a portable file system according to the present invention.

Referring now to FIG. 22 and FIGS. 24A to 24B, a tenth specific embodiment of a portable file system according to the present invention will be described in detail.

This tenth embodiment is a modification of the first embodiment described above, which uses file memory position as the file management data to be converted, instead of the user ID used in the first embodiment.

In this tenth embodiment, the portable file system has a configuration as shown in FIG. 22, which differs from the first embodiment of FIG. 3 in that the file access processing unit 17 of the portable personal data device 702 includes a target by target file memory position correspondence table memory unit 176 instead of the target by target user ID correspondence table memory unit 172 of FIG. 3. The rest of this configuration of FIG. 22 is substantially the same as in FIG. 3 described above.

Now, in general, the portable personal data device is expected to be used by being connected with various different types of stationary computer as already mentioned above. In order to make an application for exclusive use by the owner of the portable personal data device alone which is stored in the portable personal data device to be utilizable at various different types of stationary computer, it is possible to consider a provision for providing a plurality of execution files for this application in correspondence to a plurality of connection target stationary computers separately. These execution files represent the same application conceptually, but have different data contents, so that according to the conventional file management scheme, it is necessary to distinguish these execution files by giving different file names to them, but this provision to provide a plurality of conceptually identical execution files with different file names complicates the file management considerably.

In view of this fact, this tenth embodiment provides a mechanism in which a single identical file name can be given to a plurality of file data corresponding to one and the same application, and yet the file data corresponding to the currently connected stationary computer alone can be accessed from the currently connected stationary computer by using the single identical file name given to these file data.

To this end, the target by target file memory position correspondence table memory unit 176 manages a table of correspondence between each file of each directory and the file memory position of each file, for each one of all the registered connection target stationary computers. Here, this correspondence table may not necessarily manage the file memory positions for all the files of the file system of the portable personal data device, and it suffices for this correspondence table to manage the file memory positions for only those files for which the file memory positions are to be changed depending on the stationary computer connected with the portable personal data device.

In this tenth embodiment, when an application executed at the application execution unit 12 on the stationary computer 701 issues a file open request in order to make an access to a desired file, the file retrieval unit 132 in the file access unit 13 of the stationary computer 701 carries out the directory search to search out a directory to which the requested file belongs in order to determine the file position of the requested file. Here, in a case the requested file is stored in the portable personal data device 702 side, an access request for a directory is transferred to the file access processing unit 17 on the portable personal data device 702 in a course of this directory search operation.

Then, the file retrieval unit 173 in the file access processing unit 17 of the portable personal data device 702 obtains a specified directory from the file memory unit 18 according to the access request for a directory received from the stationary computer 701, and transfers a content and a storing position of this directory to the file management data conversion unit 171.

In response, the file management data conversion unit 171 checks whether the conversion of the file memory positions for the files of this directory is necessary or not according to the target by target file memory position correspondence table memory unit 176 by using the storing position of this directory. Then, only when it is necessary, the file management data conversion unit 171 converts the file memory positions for the files of this directory according to the correspondence table stored in the target by target file memory position correspondence table memory unit 176 by using the target computer ID of the currently connected stationary computer 701, and transfers the file data for this directory using the converted file data positions to the currently connected stationary computer 701.

More specifically, the target by target access file memory position correspondence table memory unit 176 stores the exemplary correspondence tables as shown in FIGS. 23A, 23B, and 23C, for three directories located at the storing positions of "0×104C", "0×1050", and "0×1060" in hexadecimal notation, respectively. Here, each correspondence table registers the file names ("Application-1", etc.) of the files for which the file memory positions are to be changed depending on the stationary computer connected with the portable personal data device, and the corresponding file memory position ("0×201A", etc.) at each connection target stationary computer ("Machine-A", etch).

In this case, the conversion of the file memory position at the file management data conversion unit 171 as outlined above is actually carried out as follows, for an exemplary case in which the directory located at the storing position of "0×1050" has a directory content as indicated in FIG. 24A, and the correspondence table shown in FIG. 23B is stored in the target by target access file memory position correspondence table memory unit 176 for this directory, while the currently connected stationary computer 701 is "Machine-B".

First, in order to check whether the conversion of the file memory positions for the files of this directory is necessary or not, the file management data conversion unit 171 searches out the correspondence table of FIG. 23B from the target by target file memory position correspondence table memory unit 176 according to the storing position "0×1050" of this directory. Here, the existence of this correspondence table of FIG. 23B for this directory implies that there is a need for the conversion of the file memory positions for the files of this directory.

Next, the file management data conversion unit 171 checks the files of this directory enlisted in the directory content of FIG. 24A given from the file retrieval unit 173, and finds out that three files ("Read.Me", "Makefile", and "Application.C") in this table are not registered in the correspondence table of FIG. 23B, so that the conversion of the file memory positions for these three files are not carried out as it is unnecessary. On the other hand, the file management data conversion unit 171 finds out that two files ("Application-3" and "Application-4") in this table are registered in the correspondence table of FIG. 23B, so that the conversion of the file memory positions for these two files are carried out as it is necessary. In this case, the file memory positions ("0×3010" and "0×401A") for these two files are converted to the file memory positions ("0×4010" and "0×4020") registered in the correspondence table of FIG. 23B for the currently connected stationary computer "Machine-B", by using the target computer ID of this currently connected stationary computer, so as to obtain the converted directory content as indicated in FIG. 24B.

This converted directory content of FIG. 24B is then transmitted to the stationary computer 701 via the file transmission and reception unit 161. Then, the file access unit 13 of the stationary computer 701 makes an access to the files of this directory according to the file memory positions registered in this converted directory content of FIG. 24B.

In the exemplary file memory position conversion operation described above, the storing position of the directory is obtained by the file retrieval unit 173, and the file memory positions for the files of this directory are converted by the file management data conversion unit 171. This file memory position conversion operation can also be realized by the following procedure. Namely, the file retrieval unit 173 searches out a plurality of file memory positions corresponding to the same file name first. Then, the file retrieval unit 173 selects the file memory position corresponding to the currently connected stationary computer from the correspondence table stored in the target by target file memory position correspondence table memory unit 176.

According to this tenth embodiment, it becomes possible to store more than one file data having the same file name but written in different types of expression, and selectively utilize the file data in a suitable type of expression at a stationary computer currently connected with the portable personal data device.

Referring now to FIG. 25, an eleventh specific embodiment of a portable file system according to the present invention will be described in detail.

This eleventh embodiment is a modification of the first embodiment described above, in which the actual file management data conversion is carried out on the stationary computer side.

In this eleventh embodiment, the portable file system has a configuration as shown in FIG. 25, which differs from the first embodiment of FIG. 3 in that the file management data conversion unit 171 in the file access processing unit 17 of the portable personal data device 802 is omitted, while the communication unit 16 of the portable personal data device 802 further includes a conversion data transmission unit 164 connected with the target by target user ID correspondence table memory unit 172, and the communication unit 14 of the stationary computer 801 further includes a file management data conversion unit 144 connected with the file input/output unit 131. The rest of this configuration of FIG. 25 is substantially the same as in FIG. 3 described above.

In many cases, the stationary computer is expected to have more processing power than the portable personal data device, and in such cases, it is advantageous to carry out the processing of the file management data conversion on the stationary computer side.

To this end, in this eleventh embodiment, the file management data conversion unit 144 for carrying out the actual processing of the file management data conversion is provided on the stationary computer 801 side, while the portable personal data device 802 is equipped with the conversion data transmission unit 164 for specifying how this conversion of the file management data should be carried out at the file management data conversion unit 144 on the stationary computer 801 side.

In this eleventh embodiment, when the communication path between the portable personal data device 802 and the stationary computer 801 are established, the stationary computer 801 transmits its own computer ID to the portable personal data device 802. Then, the target by target user ID correspondence table memory unit 172 on the portable personal data device 802 obtains a user ID suitable for this stationary computer 801 according to the target computer ID obtained at the target computer ID reception unit 162, and transfers the obtained user ID to the file management data conversion unit 144 of the stationary computer 801 via the conversion data transmission unit 164.

Thereafter, when an access request for a file stored in the portable personal data device 802 is issued from the stationary computer 801, the file management data for the requested file is read out from the file memory unit 18 of the portable personal data device 802, and transmitted to the file management data conversion unit 144 of the stationary computer 801 via the file transmission and reception unit 161. Then, at the file management data conversion unit 144, the file management data for the requested file such as the owner of the file and the protection data are converted into a form suitable for this stationary computer 801 by using the user ID specified in the conversion data obtained from the conversion data transmission unit 164, and the converted file management data are transferred to the application execution unit 12 via the file input/output unit 131.

In this manner, it is possible in this eleventh embodiment to carry out the actual processing for the file management data conversion on the stationary computer side which has more processing power than the portable personal data device in many cases.

Figure 26:
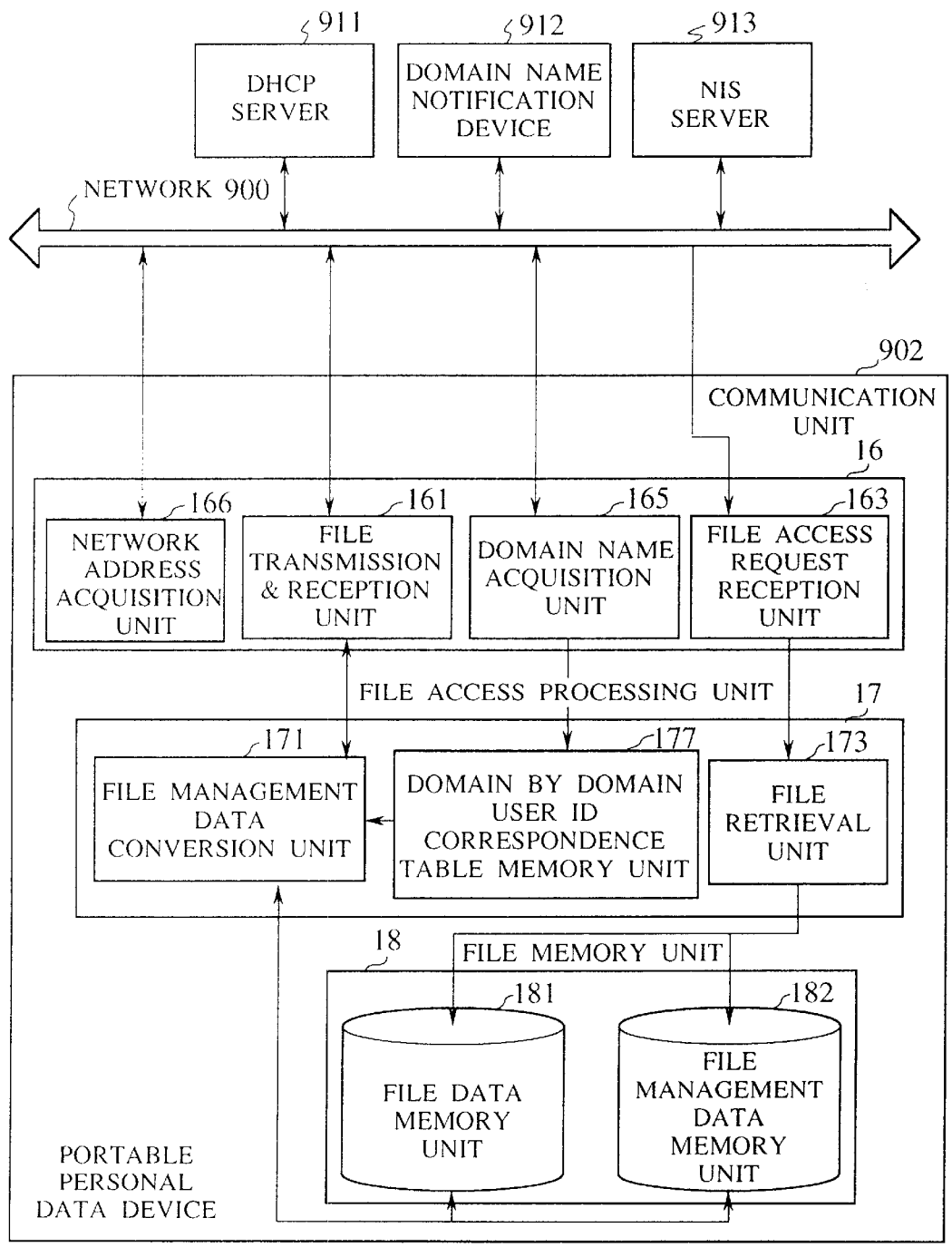
FIG. 26 is a detailed block diagram of a twelfth embodiment of a portable file system according to the present invention.

Referring now to FIG. 26, a twelfth specific embodiment of a portable file system according to the present invention will be described in detail.

Unlike the above described embodiments which are directed to a case of using the portable personal data device by connecting it to the stationary computer, this twelfth embodiment concerns with a case of using the portable personal data device by connecting it to a network such as LAN.

In general, as a system for managing and utilizing a plurality of stationary computers connected to the LAN efficiently, there is a system called NIS (Network Information Service). This NIS is a system for realizing a centralized management and sharing of the available user management data (such as user ID, password, etc.) among a plurality of stationary computers connected to the LAN, so as to provide such an environment that a correspondence between the user and the user ID is unique among the stationary computers under the management of the NIS.

Now, in a case of connecting the portable personal data device to the LAN so managed, by converting the management data of the owner of the portable personal data device to be consistent with the data managed by the NIS, it becomes possible to obtain the same effect as in a case of connecting the portable personal data device to the stationary computer. Namely, it suffices to convert the user ID of the owner of the portable personal data device stored in the file management data memory unit of the portable personal data device into the user ID given to that user within the NIS.

In this twelfth embodiment, the portable file system has a configuration as shown in FIG. 26, which differs from the first embodiment of FIG. 3 in that the communication unit 16 of the portable personal data device 902 has a domain name acquisition unit 165 and a network address acquisition unit 166 instead of the target computer ID reception unit 162, and the file access processing unit 17 of the portable personal data device 902 has a domain by domain user ID correspondence table memory unit 177 instead of the target by target user ID correspondence table memory unit 172. In addition, the the stationary computer is replaced by the network 900 connected with a DHCP (Dynamic Host Configuration Protocol) server 911, a domain name notification device 912, and an NIS server 913, and the portable personal data device 902 is connected to this network 900 via the communication unit 16. The rest of this configuration of FIG. 26 is substantially the same as in FIG. 3 described above.

In this configuration of FIG. 26, the operation since the connecting of the portable personal data device 902 to the network 900 until some other stationary computer connected to the network 900 makes a file access to the file of the portable personal data device 902 can be carried out as follows.

First, in order to use the portable personal data device 902 by connecting it to the network 900, it is necessary to determine an address of this portable personal data device 902 in that network 900. A scheme for determining this address can be the DHCP scheme, such that in response to a request from the network address acquisition unit 166, the DHCP server 911 assigns the address according to the DHCP when the portable personal data device 902 is connected to the network 900.

Next, the broadcast packet is transmitted from the domain name acquisition unit 165 to the network 900 in order to acquire a domain name. Here, the network address of the domain name notification device 912 is unknown, so that the domain name acquisition request is sent in a form of the broadcast packet. When the domain name is acquired at the domain name acquisition unit 165, the portable personal data device 902 looks up the domain by domain user ID correspondence table memory unit 177 and sets the file management data (user ID) valid within the connected domain into the file management data conversion unit 171.

Also, in order to make it possible for the other stationary computer connected to the network 900 to make an access to the file under the home directory of that user, an request for registering the file system of that portable personal data device 902 into an "automount" map file registered in the NIS server 913.

When the other stationary computer wishes to make an access to a file under the home directory of that user, at a time of making an access to the home directory, the other stationary computer inquires to the NIS server 913, and after the file system of the portable personal data device 902 is mounted, the directory search is carried out, such that it becomes possible for the other stationary computer to make a desired file access.

In this manner, it is possible in this twelfth embodiment to use the portable personal data device by connecting it to the network rather than the stationary computer.

It is to be noted that the various embodiments described above may be practiced in any desired combination.

It is also to be noted that the above described embodiments according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

For example, in the first embodiment described above, the application execution unit 12, the file access unit 13, the file memory unit 15, the file transmission and reception unit 141, and the file access request transmission unit 143 on the stationary computer side can be realized by the existing computer software technology on the stationary computer, while the file transmission and reception unit 161, the file access request reception unit 163, the file retrieval unit 173, and the file memory unit 18 on the portable personal data device side can be realized by the existing computer software technology on the portable personal data device.

Consequently, in a case of realizing the first embodiment described above, it is convenient to implement function of the own computer ID transmission unit 142 in a form of a software package for the stationary computer side, and to implement functions of the target computer ID reception unit 162, the file management data conversion unit 171, and the target by target user ID correspondence table memory unit 172 in a form of a software package for the portable personal data device.

Similarly, the various other functions in the other embodiments described above can also be implemented in a form of a software package in conjunction with the existing computer software technology.

Such a software package can be a computer program product which employs a storage medium including stored computer code which is used to program a computer to perform the disclosed function and process of the present invention. The storage medium may include, but is not limited to, any type of conventional floppy disc, optical discs, CD-ROMs, magneto-optical discs, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A portable file system, comprising:

at least one portable data processing device having memory means for storing file data and file management data of portable device files belonging to the portable data processing device, the file management data including access permit/reject data for the portable device files;

at least one stationary data processing device having processing means for executing desired processing by making accesses to the portable device files; and conversion means for converting at least the access permit/reject data among the file data and the file management data of a requested file among the portable device files, into a form suitable for the stationary data processing device, such that the processing means makes an access to the requested file among the portable device files according to converted file data/file management data obtained by the conversion means.

2. The system of claim 1, wherein the conversion means converts at least the access permit/reject data among the file data and the file management data of the requested file among the portable device files for which a file access request is issued by the processing means.

3. The system of claim 2, wherein the conversion means is provided in the portable data processing device, such that the converted file data/file management data are returned from the portable data processing device to the stationary data processing device in response to the file access request.

4. The system of claim 2, wherein the conversion means is provided in the stationary data processing device, and the portable data processing device includes means for transmitting conversion data necessary in converting said at least the access permit/reject data among the file data and the file management data at the conversion means to the stationary data processing device in response to the file access request.

5. The system of claim 1, wherein the portable data processing device includes correspondence memory means for storing a correspondence between an ID of each network domain and file management data suitable for each network domain, such that the conversion means obtains converted file management data by referring to the correspondence memory means according to the ID of a network domain to which the portable data processing device is connected.

6. The system of claim 2, wherein the conversion means checks a structure of the file management data in the stationary data processing device when the file access request is issued by the processing means, and obtains the converted file management data by converting a structure of the file management data stored in the memory means into a structure suitable for the stationary data processing device.

7. The system of claim 2, wherein the portable data processing device includes correspondence memory means for storing a correspondence between an ID of each stationary data processing device and the file management data suitable for each stationary data processing device, such that the conversion means obtains the converted file management data by referring to the correspondence memory means according to the ID of the stationary data processing device which issued the file access request.

8. The system of claim 1, wherein the stationary data processing device includes:
file memory means for storing stationary device files belonging to the stationary data processing device; and
mount point memory means for storing a mount point data indicating a mount point in the stationary device files to which the portable device files are to be mounted, and a mounting target point data indicating a mounting target point in the portable device files at which the portable device files are to be mounted to the stationary device files, in correspondence to a user ID of an owner of each portable data processing device.

9. The system of claim 8, wherein the portable data processing device includes mounting method specifying means for specifying a manner of mounting the portable device files to the stationary device files, and the stationary data processing device further includes mounting control means for controlling the manner of mounting the portable device files to the stationary device files according to the manner specified by the mounting method specifying means.

10. The system of claim 1, wherein the stationary data processing device includes back-up means for automatically producing and storing a back-up of the portable device files in the stationary data processing device while the processing means is accessible to the portable device files, and updating the back-up according to a change in the portable device files made by the processing executed by the processing means.

11. The system of claim 10, wherein the stationary data processing device allows accesses to files in the back-up from the processing means while the processing means is not accessible to the portable device files in the portable data processing device.

12. The system of claim 10, wherein the portable data processing device includes back-up control means for specifying a manner of producing the back-up in each stationary data processing device, such that the back-up means of each stationary data processing device produces the back-up according to the manner specified by the back-up control means.

13. The system of claim 1, further comprising an ID data device, to be carried around by an owner of each portable data processing device, for emitting an ID data signal to authenticate a carrier of the ID data device as the owner of each portable data processing device, such that each portable data processing device authenticates a user as the owner of each portable data processing device according to the ID data signal emitted from the ID data device.

14. The system of claim 13, wherein the stationary data processing device and the portable data processing device are set in communication with each other when the portable data processing device is placed in a prescribed vicinity of the stationary data processing device, and the portable data processing device includes data protection means for making the portable device files accessible from the processing means of the stationary data processing device when the ID data device carried around by the owner of the portable data processing device is judged to be present within a prescribed proximity from the portable data processing device according to the ID data signal emitted from the ID data device.

15. The system of claim 1, wherein the stationary data processing device includes means for transmitting a pass word entered by a user using the stationary data processing device to the portable data processing device, and the portable data processing device includes data protection means for making the portable device files accessible from the processing means of the stationary data processing device when the user using the stationary data processing device is judged as a proper user of the portable data processing device according to the pass word transmitted from the stationary data processing device.

16. The system of claim 1, wherein the file management data includes a user ID of an owner of each portable data processing device, and the conversion means converts the user ID Into a form valid on the stationary data processing device.

17. The system of claim 2, wherein the portable device files include more than one file having an identical file name but written in different types of expression and stored at different memory positions in the memory means, the stationary data processing device issues the file access request by specifying a file name, the file management data includes a file memory position data for each requested file for which the file access request is issued indicating a memory position in the memory means at which each requested file is stored, and the conversion means converts the file memory position data for each requested file into a form valid on the stationary data processing device, such that when the file access request specifying the identical file name of said more than one file is issued, the processing means of the stationary data processing device makes an access to one of said more than one file written in a type of expression suitable for the stationary data processing device according to the converted file management data.

18. The system of claim 2, wherein the portable data processing device checks parameters specifying a computing environment of the stationary data processing device when the file access request is issued by the processing means, and the conversion means obtains the converted file data by converting values of the parameters checked by the portable data processing device that are contained in the file data stored in the memory means into values suitable for the stationary data processing device.

19. The system of claim 1, wherein the stationary data processing device and the portable data processing device are set in communication with each other when the portable data processing device is placed in a prescribed vicinity of the stationary data processing device.

20. The system of claim 19, wherein the portable data processing device is placed in the prescribed vicinity of the stationary data processing device by an owner of the portable data processing device when the owner uses the portable device files on the stationary data processing device.

21. The system of claim 1, wherein a plurality of stationary data processing devices are connected to a network and grouped into a plurality of domains on the network, and the conversion means is provided in the portable data processing device, such that the conversion means converts at least one of the file data and the file management data of each requested file for which a file access request is received from one stationary data processing device belonging to one domain on the network into a form suitable for said one domain on the network, and returns converted file data/file management data to said one stationary data processing device via the network in response to the file access request.

22. A portable file system, comprising:
- a portable data processing device having memory means for storing files; and
- a stationary data processing device having processing means for executing desired processing by making accesses to the files stored in the memory means and having control means for controlling an execution of the processing by the processing means depending on who is operating the processing means;
- wherein the portable data processing device includes means for returning a user ID valid on the stationary data processing device of an owner of each requested file for which a file access request is issued by the processing means, to the stationary data processing device, in response to the file access request received from the stationary data processing device; and
- the control means controls the execution of the processing by the processing means according to the user ID returned from the portable data processing device.

23. A portable file system, comprising:
- a portable data processing device having memory means for storing files; and
- a stationary data processing device having processing means for executing desired processing by making accesses to the files stored in the memory means and having control means for controlling an execution of the processing by the processing means depending on an access permit/reject data of each file;
- wherein the portable data processing device includes means for returning an access permit/reject data valid on the stationary data processing device for each requested file for which a file access request is issued by the processing means, to the stationary data processing device, in response to the file access request received from the stationary data processing device; and
- the control means controls the execution of the processing by the processing means according to the access permit/reject data returned from the portable data processing device.

24. A portable data processing device to be used in conjunction with a stationary data processing device, comprising:
- a memory for storing file data and file management data of files, the file management data including access permit/reject data for portable data processing device files; and
- a conversion unit for converting at least the access Permit/reject data among the file data and the file management data of a file requested from the stationary data processing device into data suitable for the stationary data processing device, such that the stationary data processing device makes an access to the requested file according to converted file data/file management data obtained by the conversion unit.

25. A portable data processing device to be used in conjunction with a stationary data processing device, comprising:
- memory means for storing file data and file management data of files, the file management data including an access permit/reject data for the portable data processing device files; and
- conversion control means for controlling the stationary data processing device to convert at least the access permit/reject data among the file data and the file management data of each requested file for which a file access request is received from the stationary data processing device into a form suitable for the stationary data processing device, by transmitting conversion data necessary in converting said at least the access permit/reject data among the file data and the file management data at the stationary data processing device in response to the file access request, such that the stationary data processing device makes an access to each requested file according to converted file data/file management data obtained by using the conversion data.

26. A stationary data processing device to be used in conjunction with a portable data processing device, comprising:
- processing means for executing desired processing by making accesses to portable device files belonging to and stored in the portable data processing device; and
- conversion means for converting at least access permit/reject data among file data and file management data of each requested file among the portable device files for which a file access request is issued by the processing means into a form suitable for the stationary data processing device, according to conversion data necessary in converting said at least access permit/reject data among the file data and the file management data provided by the portable data processing device in response to the file access request, such that the processing means makes an access to each requested file according to converted file data/file management data obtained by the conversion means.

27. A portable data processing device to be used in conjunction with a network to which a stationary data processing device is connected, comprising:
- a memory for storing file data and file management data of files, the file management data including access permit/reject data for the portable data processing device files; and
- a conversion unit for converting at least the access permit/reject data among the file data and the file management data of a file requested by the stationary data processing device via the network into data suitable for the network, such that the stationary data processing device makes an access via the network to the requested file according to converted file data/file management data obtained by the conversion unit.

28. A method of file data processing, comprising the steps of:
- forming a portable file system of at least one portable data processing device having a memory for storing file data and file management data of portable device files, and at least one stationary data processing device having a processor for executing desired processing by making accesses to the portable device files, the file management data including access permit/reject data for the portable device files;
- converting at least the access permit/reject data among the file data and the file management data of a requested file among the portable device files, into a form suitable for the stationary data processing device, at a conversion unit; and
- making an access to the requested file among the portable device files at the processor according to converted file data/file management data obtained by the conversion unit.

29. The method of claim 28, further comprising the step of issuing a file access request for the requested file among the portable device files from the processor, such that the converting step converts at least the access permit/reject data among the file data and the file management data of the requested file among the portable device files for which the file access request is issued by the processor.

30. The method of claim 28, further comprising the step of storing a correspondence between an ID of each network domain and the file management data suitable for each network domain in the portable data processing device, such that the conversion unit obtains converted file management data by referring to stored correspondence according to the ID of a network domain to which the portable data processing device is connected.

31. The method of claim 29, wherein the conversion unit is provided in the portable data processing device, and the method further comprises the step of returning the converted file data/file management data obtained at the converting step from the portable data processing device to the stationary data processing device in response to the file access request.

32. The method of claim 29, wherein the conversion unit is provided in the stationary data processing device, and the method further comprises the step of transmitting conversion data necessary in converting said at least the access permit/reject data among the file data and the file management data at the conversion unit from the portable data processing device to the stationary data processing device in response to the file access request.

33. The method of claim 29, further comprising the step of checking a structure of the file management data in the stationary data processing device at the conversion unit when the file access request is issued by the processing means at the issuing step, such that the conversion unit obtains the converted file management data by converting a structure of the file management data stored in the memory means into a structure suitable for the stationary data processing device at the converting step.

34. The method of claim 29, further comprising the step of storing a correspondence between an ID of each stationary data processing device and the file management data suitable for each stationary data processing device at a correspondence memory in the portable data processing device, such that the conversion unit obtains the converted file management data by referring to the correspondence memory unit according to the ID of the stationary data processing device which issued the file access request at the converting step.

35. The method of claim 28, further comprising the steps of:
storing stationary device files belonging to the stationary data processing device at a file memory in the stationary data processing device; and
storing a mount point data indicating a mount point in the stationary device files to which the portable device files are to be mounted, and a mounting target point data indicating a mounting target point in the portable device files at which the portable device files are to be mounted to the stationary device files, in correspondence to a user ID of an owner of each portable data processing device, at a mount point memory in the stationary data processing device.

36. The method of claim 35, further comprising the steps of:
specifying a manner of mounting the portable device files to the stationary device files from the portable data processing device to the stationary data processing device; and controlling the manner of mounting the portable device files to the stationary device files at the stationary data processing device according to the manner specified from the portable data processing device.

37. The method of claim 28, further comprising the steps of:
automatically producing and storing a back-up of the portable device files in the stationary data processing device while the processing means is accessible to the portable device files; and
updating the back-up according to a change in the portable device files made by the processing executed by the processing means.

38. The method of claim 37, further comprising the step of allowing accesses to files in the back-up from the processing means at the stationary data processing device while the processing means is not accessible to the portable device files in the portable data processing device.

39. The method of claim 37, further comprising the step of specifying a manner of producing the back-up in each stationary data processing device from the portable data processing device, such that each stationary data processing device produces the back-up according to the manner specified from the portable data processing device.

40. The method of claim 28, further comprising the steps of:
providing an ID data device, to be carried around by an owner of each portable data processing device, for emitting an ID data signal to authenticate a carrier of the ID data device as the owner of each portable data processing device; and
authenticating a user as the owner of each portable data processing device according to the ID data signal emitted from the ID data device at each portable data processing device.

41. The method of claim 40, further comprising the steps of:
setting the stationary data processing device and the portable data processing device in communication with each other by placing the portable data processing device in a prescribed vicinity of the stationary data processing device; and
making the portable device files accessible from the processing means of the stationary data processing device at the portable data processing device when the ID data device carried around by the owner of the portable data processing device is judged to be present within a prescribed proximity from the portable data processing device according to the ID data signal emitted from the ID data device.

42. The method of claim 28, further comprising the steps of:
transmitting a pass word entered by a user using the stationary data processing device from the stationary data processing device to the portable data processing device; and
making the portable device files accessible from the processing means of the stationary data processing device at the portable data processing device when the user using the stationary data processing device is judged as a proper user of the portable data processing device according to the pass word transmitted from the stationary data processing device.

43. The method of claim 28, wherein the file management data includes a user ID of an owner of each portable data processing device, and the conversion unit converts the user ID into a form valid on the stationary data processing device at the converting step.

44. The method of claim 29, wherein the portable device file include more than one files having an identical file name but written in different types of expression and stored at different memory positions in the memory means, the stationary data processing device issues the file access request by specifying a file name, the file management data includes a file memory position data for each requested file for which the file access request is issued indicating a memory position in the memory means at which each requested file is stored, and the conversion unit converts the file memory position data for each requested file into a form valid on the stationary data processing device at the converting step, such that when the file access request specifying the identical file name of said more than one file is issued at the issuing step, the processing means of the stationary data processing device makes an access to one of said more than one file written in a type of expression suitable for the stationary data processing device according to the converted file management data.

45. The method of claim 29, further comprising the step of checking parameters specifying a computing environment of the stationary data processing device at the portable data processing device when the file access request is issued by the processing means at the issuing step, such that the conversion unit obtains the converted file data by converting values of the parameters checked by the portable data processing device that are contained in the file data stored in the memory means into values suitable for the stationary data processing device at the converting step.

46. The method of claim 28, further comprising the step of setting the stationary data processing device and the portable data processing device in communication with each other by placing the portable data processing device in a prescribed vicinity of the stationary data processing device.

47. The method of claim 46, wherein the portable data processing device is placed in the prescribed vicinity of the stationary data processing device by an owner of the portable data processing device when the owner uses the portable device files on the stationary data processing device.

48. The method of claim 28, wherein at the forming step, a plurality of stationary data processing devices are connected to a network and grouped into a plurality of domains on the network, and at the converting step, the conversion unit is provided in the portable data processing device, such that the conversion unit converts at least one of the file data and the file management data of each requested file for which a file access request is received from one stationary data processing device belonging to one domain on the network into a form suitable for said one domain on the network, and returns converted file data/file management data to said one stationary data processing device via the network in response to the file access request.

49. A method of file data processing, comprising the steps of:

forming a portable file system of a portable data processing device having memory means for storing files, and a stationary data processing device having processing means for executing desired processing by making accesses to the files stored in the memory means and having control means for controlling an execution of the processing by the processing means depending on who is operating the processing means;

issuing a file access request for each requested file among the files stored in the memory means from the processing means;

returning a user ID valid on the stationary data processing device of an owner of each requested file for which a file access request is issued by the processing means, from the portable data processing device to the stationary data processing device, in response to the file access request received from the stationary data processing device; and controlling the execution of the processing by the processing means according to the user ID returned from the portable data processing device.

50. A method of file data processing, comprising the steps of:

forming a portable file system of a portable data processing device having memory means for storing files, and a stationary data processing device having processing means for executing desired processing by making accesses to the files stored in the memory means and having control means for controlling an execution of the processing by the processing means depending on an access permit/reject data of each file;

issuing a file access request for each requested file among the files stored in the memory means from the processing means;

returning an access permit/reject data valid on the stationary data processing device for each requested file for which a file access request is issued by the processing means, from the portable data processing device to the stationary data processing device, in response to the file access request received from the stationary data processing device; and controlling the execution of the processing by the processing means according to the access permit/reject data returned from the portable data processing device.

51. An article of manufacture, comprising:

a computer usable medium having computer readable program code means embodied therein for causing a computer to function as a portable personal data device to be used in conjunction with a stationary data processing device, the computer readable program code means including first computer readable program code means for causing the computer to store a correspondence between an ID of each stationary data processing device and a file management data suitable for each stationary data processing device; and second computer readable program code means for causing the computer to receive the ID of the stationary data processing device which issued a file access request; and third computer readable program code means for causing the computer to convert a file management data of each requested file for which the file access request is received from the stationary data processing device into a form suitable for the stationary data processing device by referring to the correspondence stored by the first computer readable program code means according to the ID of the stationary data processing device received by the second computer readable program code means, and to return converted file management data to the stationary data processing device in response to the file access request such that the stationary data processing device makes an access to each requested file according to converted file management data returned from the computer.

52. A method of file data processing between a first data processing device having a memory for storing file data and file management data and a second data processing device having a processor for executing a desired processing, the file management data including access permit/reject data, the method comprising the steps of:

converting at least the access permit/reject data among the file data and the file management data of a file stored in the first data processing device which is to be accessed by the second data processing device, into data suitable for the second data processing device; and making an access to the file according to converted file data/file management data obtained by the converting step.

53. A portable file system, comprising:

at least one portable data processing device having memory means for storing file data and file management data of portable device files belonging to the portable data processing device;

at least one stationary data processing device having processing means for executing desired processing by making accesses to the portable device files; and conversion means for converting at least one of the file data and the file management data of a requested file among the portable device files for which a file access request is issued by the processing means into a form suitable for the stationary data processing device, such that the processing means makes an access to the requested file among the portable device files according to converted file data/file management data obtained by the conversion means;

wherein the portable data processing device includes correspondence memory means for storing a correspondence between an ID of each stationary data processing device and file management data suitable for each stationary data processing device, such that the conversion means obtains converted file management data by referring to the correspondence memory means according to the ID of the stationary data processing device which issued the file access request.

54. A method of file data processing, comprising the steps of:

providing a portable file system of at least one portable data processing device having memory means for storing file data and file management data of portable device files, and at least one stationary data processing device having processing means for executing desired processing by making accesses to the portable device files;

storing a correspondence between an ID of each stationary data processing device and file management data suitable for each stationary data processing device in the portable data processing device;

issuing a file access request for a requested file among the portable device files from the processing means;

converting at least one of the file data and the file management data of the requested file among the portable device files for which the file access request is issued by the processing means into a form suitable for the stationary data processing device, at a conversion unit, by referring to stored correspondence according to the ID of the stationary data processing device which issued the file access request; and making an access to the requested file among the portable device files at the processing means according to converted file data/file management data obtained by the conversion unit.

55. A portable file system, comprising:

at least one portable data processing device having memory means for storing file data and file management data of portable device files belonging to the portable data processing device;

at least one stationary data processing device having processing means for executing desired processing by making accesses to the portable device files; and conversion means for converting at least one of the file data and the file management data of a requested file among the portable device files into a form suitable for the stationary data processing device, such that the processing means makes an access to the requested file among the portable device files according to converted file data/file management data obtained by the conversion means;

wherein the portable data processing device includes correspondence memory means for storing a correspondence between an ID of each network domain and file management data suitable for each network domain, such that the conversion means obtains converted file management data by referring to the correspondence memory means according to the ID of a network domain to which the portable data processing device is connected.

56. A method of file data processing, comprising the steps of:

providing a portable file system of at least one portable data processing device having memory means for storing file data and file management data of portable device files, and at least one stationary data processing device having processing means for executing desired processing by making accesses to the portable device files;

storing a correspondence between an ID of each network domain and file management data suitable for each network domain in the portable data processing device;

converting at least one of the file data and the file management data of a requested file among the portable device files into a form suitable for the stationary data processing device, at a conversion unit, by referring to stored correspondence according to the ID of a network domain to which the portable data processing device is connected; and making an access to the requested file among the portable device files at the processing means according to converted file data/file management data obtained by the conversion unit.

57. A portable file system, comprising:

at least one portable data processing device having memory means for storing file data and file management data of portable device files belonging to the portable data processing device; and at least one stationary data processing device having processing means for executing desired processing by making accesses to the portable device files, and back-up means for automatically producing and storing a back-up of the portable device files in the stationary data processing device while the processing means is accessible to the portable device files, and updating the back-up according to a change in the portable device files made by processing executed by the processing means.

58. A method of file data processing, comprising the steps of:

providing a portable file system of at least one portable data processing device having memory means for storing file data and file management data of portable device files, and at least one stationary data processing device having processing means for executing desired processing by making accesses to the portable device files;

making an access to a file among the portable device files at the processing means;

automatically producing and storing a back-up of the portable device files in the stationary data processing device while the processing means is accessible to the portable device files; and updating the back-up according to a change in the portable device files made by processing executed by the processing means.

* * * * *